United States Patent
Seo et al.

(10) Patent No.: US 9,132,552 B2
(45) Date of Patent: Sep. 15, 2015

(54) ROBOT AND FRICTION COMPENSATION METHOD THEREFOR

(71) Applicant: Samsung Electronics Co., Ltd., Suwon-si (KR)

(72) Inventors: Kee Hong Seo, Seoul (KR); Young Do Kwon, Yongin-si (KR); Kyung Shik Roh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 14/089,727

(22) Filed: Nov. 25, 2013

(65) Prior Publication Data

US 2014/0156074 A1    Jun. 5, 2014

(30) Foreign Application Priority Data

Nov. 23, 2012 (KR) .................. 10-2012-0133922

(51) Int. Cl.
*B25J 9/16* (2006.01)
*B25J 3/04* (2006.01)

(52) U.S. Cl.
CPC *B25J 9/1689* (2013.01); *B25J 3/04* (2013.01); *G05B 2219/39181* (2013.01)

(58) Field of Classification Search
CPC .................. B25J 3/00; B25J 3/04; B25J 3/02; B25J 9/1689
See application file for complete search history.

(56) References Cited

U.S. PATENT DOCUMENTS

| 4,999,553 | A  | * | 3/1991  | Seraji ............................ 700/245 |
| 5,049,796 | A  | * | 9/1991  | Seraji ........................ 318/568.1 |
| 6,659,939 | B2 | * | 12/2003 | Moll et al. .................... 600/102 |
| 6,899,705 | B2 | * | 5/2005  | Niemeyer ......................... 606/1 |
| 7,212,886 | B2 | * | 5/2007  | Nagata et al. ................. 700/245 |
| 7,819,859 | B2 | * | 10/2010 | Prisco et al. ..................... 606/1 |
| 8,442,685 | B2 | * | 5/2013  | Ooga et al. .................... 700/261 |
| 2004/0164960 | A1 | * | 8/2004 | Jacobus et al. ................ 345/161 |
| 2004/0243110 | A1 |   | 12/2004 | Niemeyer |
| 2006/0041249 | A1 |   | 2/2006  | Niemeyer |
| 2014/0100492 | A1 | * | 4/2014  | Nagasaka ....................... 601/34 |

FOREIGN PATENT DOCUMENTS

| JP | 2004-94368 A    | 3/2004 |
| JP | 2012-24877 A    | 2/2012 |
| KR | 1999-0044574 A  | 6/1999 |

* cited by examiner

*Primary Examiner* — Nicholas Kiswanto
(74) *Attorney, Agent, or Firm* — NSIP Law

(57) ABSTRACT

A robot includes a master device including an input unit, the input unit including a first end effector and a first joint, a slave device configured to be controlled by the master device and including a robot arm, the robot arm including a second end effector, a second joint, and a motor configured to drive the second joint, and a controller configured to calculate a friction compensation value to compensate for friction of the second joint based on a speed of the input unit in response to the input unit being in motion, generate a control signal based on the friction compensation value, and transmit the control signal to the motor configured to drive the second joint.

20 Claims, 9 Drawing Sheets

ROBOT AND FRICTION COMPENSATION METHOD THEREFOR

CROSS-REFERENCE TO RELATED APPLICATIONS

This application claims the benefit of Korean Patent Application No. 10-2012-0133922 filed on Nov. 23, 2012, in the Korean Intellectual Property Office, the entire disclosure of which is incorporated herein by reference for all purposes.

BACKGROUND

1. Field

This application relates to a robot and a friction compensation method for the robot that enhance tracking performance between a master device and a slave device of the robot.

2. Description of Related Art

A robot is a mechanical device that automatically performs any operation or work. Robots operate using power instead of people or along with people, and may be classified into home robots, exploration robots, industrial robots, and medical robots, for example, depending on their field of use.

A medical robot may be called a surgical robot, and may be applied to various fields of medicine including surgery. The surgical robot may include a master device and a slave device that is remotely controlled by the master device.

The master device includes an input unit, and an operator may remotely control movement of the slave device by manipulating the input unit.

The slave device may include a robot arm to which a surgical instrument is coupled, and a body to which the robot arm is connected. The robot arm may include a plurality of links, and a motor may be provided at each connection portion (i.e., joint) between the links.

The motor provided at the joint may be driven to follow a speed set by the input unit of the master device. When driving the motor provided at the joint, it may be necessary to perform friction compensation to compensate for friction of each joint.

In a conventional surgical robot, to compensate for friction, a speed sensor is provided at each joint of the robot arm to measure a speed of the joint. A friction compensation value is calculated based on the measured speed of the joint. The motor performs friction compensation based on the calculated friction compensation value.

However, although a friction compensation method used in the conventional surgical robot may improve a motion of the robot arm because it compensates for friction of the joint of the robot arm based on a speed of the joint, the amount of friction compensation must be limited to ensure that movement of a slave device (or master device) more accurately tracks movement of a master device (or slave device).

SUMMARY

In one general aspect, a robot includes a master device including an input unit, the input unit including a first end effector and a first joint; a slave device configured to be controlled by the master device and including a robot arm, the robot arm including a second end effector, a second joint, and a motor configured to drive the second joint; and a controller configured to calculate a friction compensation value to compensate for friction of the second joint based on a speed of the input unit in response to the input unit being in motion; generate a control signal based on the friction compensation value; and transmit the control signal to the motor configured to drive the second joint.

The controller may be further configured to calculate the friction compensation value based on a speed of the input unit and a kinetic friction of the second joint in response to the robot arm being in motion; and calculate the friction compensation value based on the speed of the input unit, a maximum stationary friction of the second joint, and a motion direction of the input unit in response to the robot arm being stationary, a sign of the friction compensation value being determined based on the motion direction of the input unit.

The controller may be provided at the master device or the slave device.

The master device may further include a speed detector configured to detect the speed of the input unit.

The master device may further include a position detector configured to detect a position of the input unit; and the controller may be further configured to calculate the speed of the input unit based on the position of the input unit.

The controller may be further configured to calculate the friction compensation value by transforming the speed of the input unit into a speed of the second joint; and multiplying the speed of the second joint by a friction coefficient of the second joint to obtain the friction compensation value.

In another general aspect, a robot includes a master device including an input unit, the input unit including a first end effector, a first joint, and a motor configured to drive the first joint; a slave device configured to be controlled by the master device and including a robot arm, the robot arm including a second end effector and a second joint; and a controller configured to calculate a friction compensation value to compensate for friction of the first joint based on a speed of the robot arm in response to the robot arm being in motion; generate a control signal based on the friction compensation value; and transmit the control signal to the motor configured to drive the first joint.

The controller may be further configured to calculate the friction compensation value based on a speed of the robot arm and a kinetic friction of the first joint in response to the input unit being in motion; and calculate the friction compensation value based on the speed of the robot arm, a maximum stationary friction of the first joint, and a motion direction of the robot arm in response to the input unit being stationary, a sign of the friction compensation value being determined based on the motion direction of the robot arm.

The controller may be further configured to calculate the friction compensation value by transforming the speed of the robot arm into a speed of the first joint; and multiplying the speed of the first joint by a friction coefficient of the first joint.

The slave device may further include a speed detector configured to detect the speed of the robot arm.

The slave device may further include a position detector configured to detect a position of the robot arm; and the controller may be further configured to calculate the speed of the robot arm based on the position of the robot arm.

The controller may be provided at the master device or the slave device.

In another general aspect, a robot includes a master device including an input unit, the input unit including a first end effector, a first joint, and a first motor configured to drive the first joint; a slave device configured to be controlled by the master device and including a robot arm, the robot arm including a second end effector, a second joint, and a second motor configured to drive the second joint; a first controller configured to calculate a first friction compensation value to compensate for friction of the second joint based on a speed of the input unit in response to the input unit being in motion; generate a first control signal based on the first friction compensation value; and transmit the first control signal to the second motor configured to drive the second joint; and a second controller configured to calculate a second friction compensation value to compensate for friction of the first joint based on a speed of the robot arm in response to the robot arm being in motion; generate a second control signal based on the second friction compensation value; and transmit the second control signal to the first motor configured to drive the first joint.

The first controller may be further configured to calculate the first friction compensation value based on a speed of the input unit and a kinetic friction of the second joint in response to the robot arm being in motion; and calculate the first friction compensation value based on the speed of the input unit, a maximum stationary friction of the second joint, and a motion direction of the input unit in response to the robot arm being stationary, a sign of the first friction compensation value being determined based on the motion direction of the input unit.

The first controller may be further configured to calculate the first friction compensation value by transforming the speed of the input unit into a speed of the second joint; and multiplying the speed of the second joint by a friction coefficient of the second joint to obtain the first friction compensation value.

The master device may further include a speed detector configured to detect the speed of the input unit.

The master device may further include a position detector configured to detect a position of the input unit; and the first controller may be further configured to calculate the speed of the input unit based on the position of the input unit.

The second controller may be further configured to calculate the second friction compensation value based on a speed of the robot arm and a kinetic friction of the first joint in response to the input unit being in motion; and calculate the second friction compensation value based on the speed of the robot arm, a maximum stationary friction of the first joint, and a motion direction of the robot arm in response to the input unit being stationary, a sign of the second friction compensation value being determined based on the motion direction of the robot arm.

The second controller may be further configured to calculate the second friction compensation value by transforming the speed of the robot arm into a speed of the first joint; and multiplying the speed of the second joint by a friction coefficient of the first joint to obtain the second friction compensation value.

The first controller may be provided at the master device or the slave device; and the second controller may be provided at the master device or the slave device.

In another general aspect, a robot includes a first device including an input unit; a second device configured to be controlled by the first device in response to manipulation of the input unit by a user and including a robot arm; and a controller configured to generate a control signal to control movement of the robot arm and compensate for friction of the robot arm based on a speed of the input unit; and transmit the control signal to the robot arm.

The controller may be further configured to generate a friction compensation value to compensate for the friction of the robot arm based on the speed of the input unit in response to the robot arm being in motion, and based on a maximum stationary friction of the robot arm in response to the robot arm being stationary; and generate the control signal based on the friction compensation value.

The robot may further include another controller configured to generate another control signal to control movement of the input unit and compensate for friction of the input unit based on a speed of the robot arm; and transmit the other control signal to the input unit.

The other controller may be further configured to generate a friction compensation value to compensate for the friction of the input unit based on the speed of the robot arm in response to the input unit being in motion, and based on a maximum stationary friction of the input unit in response to the input unit being stationary; and generate the other control signal based on the friction compensation value.

Other features and aspects will be apparent from the following detailed description, the drawings, and the claims.

DETAILED DESCRIPTION

Figure 1:
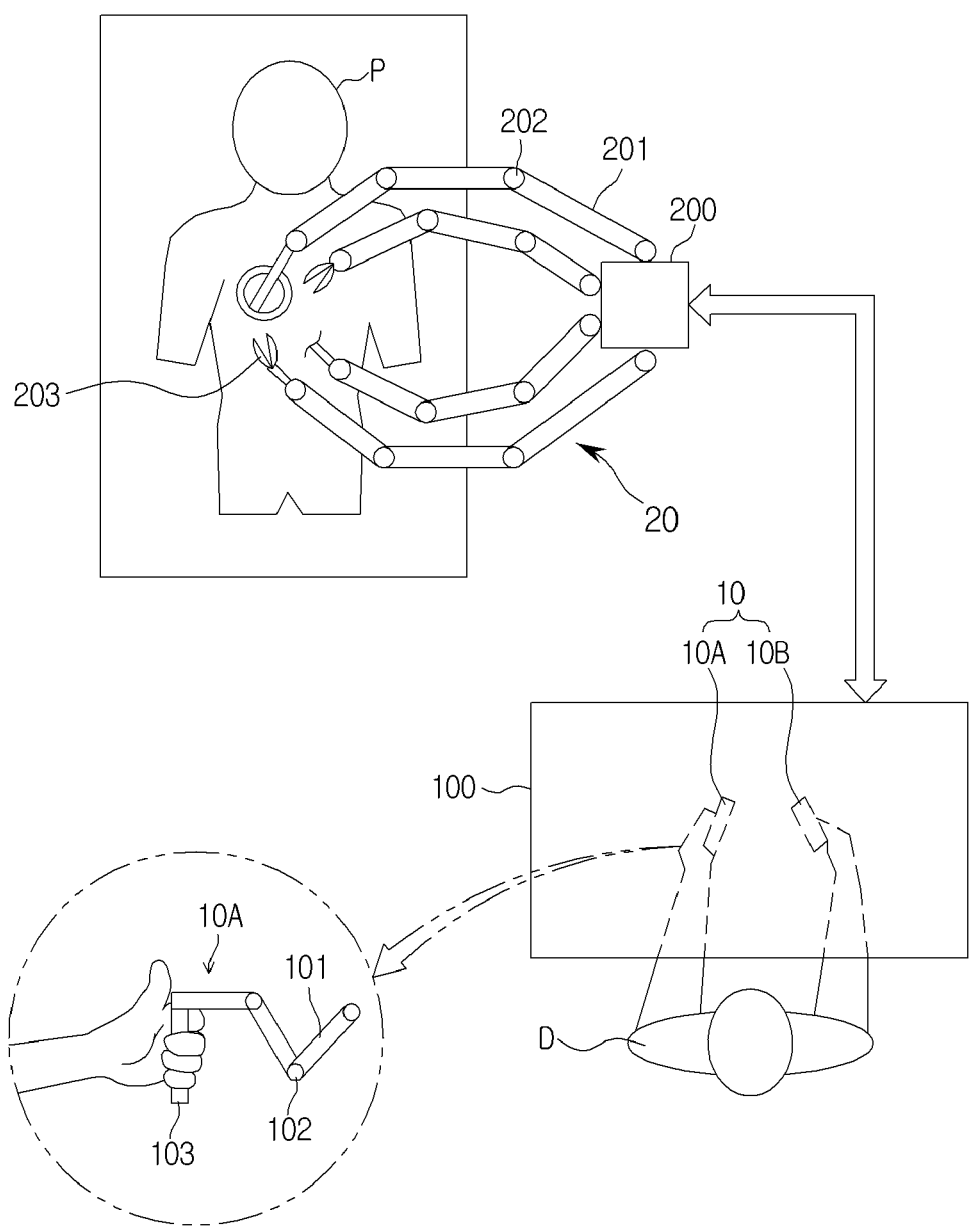
FIG. 1 is a diagram schematically illustrating an example of a configuration of a surgical robot.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 is a diagram schematically illustrating an example of a configuration of a surgical robot. The surgical robot includes a master device 100 and a slave device 200. The master device 100 and the slave device 200 may include the same or similar functional components. In the following description, for convenience of description, components included in the master device 100 are designated 'first' and components included in the slave device 200 are designated 'second' to distinguish the components of the master device 100 from the components of the slave device 200.

The master device 100 has a function of controlling the slave device 200. The master device 100 includes an input unit 10 and a first display unit (not shown in FIG. 1, but see the first display unit 160 in FIG. 2).

The input unit 10 may receive an instruction regarding operation of the master device 100, or an instruction for remote control of operation of the slave device 200. For example, the input unit 10 may include any one or any combination of a haptic device, a clutch pedal, a switch, and a button. In the following description, a haptic device as the input unit 10 will be described by way of example.

The haptic device may include at least one handle unit. FIG. 1 illustrates an example in which the haptic device includes two handle units 10A and 10B. An operator D may grip the two handle units 10A and 10B respectively with both hands and manipulate the respective handle units 10A and 10B to control operations of robot arms 20 of the slave device 200. Each of the handle units 10A and 10B may include a first end effector 103, a plurality of first links 101, a plurality of first joints 102, and first detectors (not shown in FIG. 1, but see the first position detector 110, the first force/torque detector 120, and the first speed detector 125 in FIG. 2).

The first end effector 103 is a component that the hand of the operator D touches. The first end effector 103 may take the form of a pencil or stick to allow the operator D to hold the first end effector 103, or may take the form of scissors to allow the operator D to insert at least one finger into the first end effector 103. However, the shape of the first end effector 103 is not limited to the aforementioned examples, and the first end effector 103 may have any other shape that enables the operator D to control operations of the robot arms 20 by manipulating the first end effector 103. In addition, the first end-effectors 103 provided respectively at the two handle units 10A and 10B may have the same shape or different shapes.

The first joints 102 are connection portions between the links 101. The first joints 102 may have at least 1 degree of freedom (DOF). A DOF means a degree of freedom in kinematics or reverse kinematics. The DOF of an instrument is the number of independent motions of the instrument, or the number of variables that determine independent motions with the respect to relative positions between links. For example, an object in a 3D space defined by X-, Y-, and Z-axes has at least one DOF of 3 DOFs (positions on the individual axes) to determine a spatial position of the object, and 3 DOFs (rotation angles with respect to the individual axes) to determine a spatial orientation of the object. More specifically, it will be appreciated that if an object is movable along each of the X-, Y- and Z-axes and is rotatable about each of the X-, Y- and Z-axes, then the object has 6 DOFs.

The first detectors 110, 120, and 125 may be provided at each first joint 102 to detect data regarding the state of the first joint 102. The first detectors 110, 120, and 125 may include a first force/torque detector 120 to detect a force/torque applied to the first joint 102, a first position detector 110 to detect a position of the first joint 102, and a first speed detector 125 to detect a speed of the first joint 102. The first speed detector 125 may be omitted depending on the kind of a position sensor used as the first position detector 110.

The master device 100 may be connected to the slave device 200 via a network. The network may be a wired network, a wireless network, or a combination thereof, or any other network known to one of ordinary skill in the art. The master device 100 connected to the slave device 200 via a network may transmit a control signal to the slave device 200. In addition, the master device 100 may receive either one or both of an image signal and data regarding the operational state of the robot arm 20 from the slave device 200, and display the received image or data via a first display unit (now shown in FIG. 1, but see the first display unit 160 in FIG. 2).

The slave device 200 may be moved in response to the control signal received from the master device 100. The slave device 200 may include a body and one or more robot arms 20 connected to the body, and a second display unit (not shown in FIG. 1, but see the second display unit 260 in FIG. 2) that displays an image captured by an image capture unit such as an endoscope mounted on a particular robot arm 20 among the one or more robot arms 20 of the slave device 200. The image capture unit may be any image capture unit known to one of ordinary skill in the art.

Figure 2:
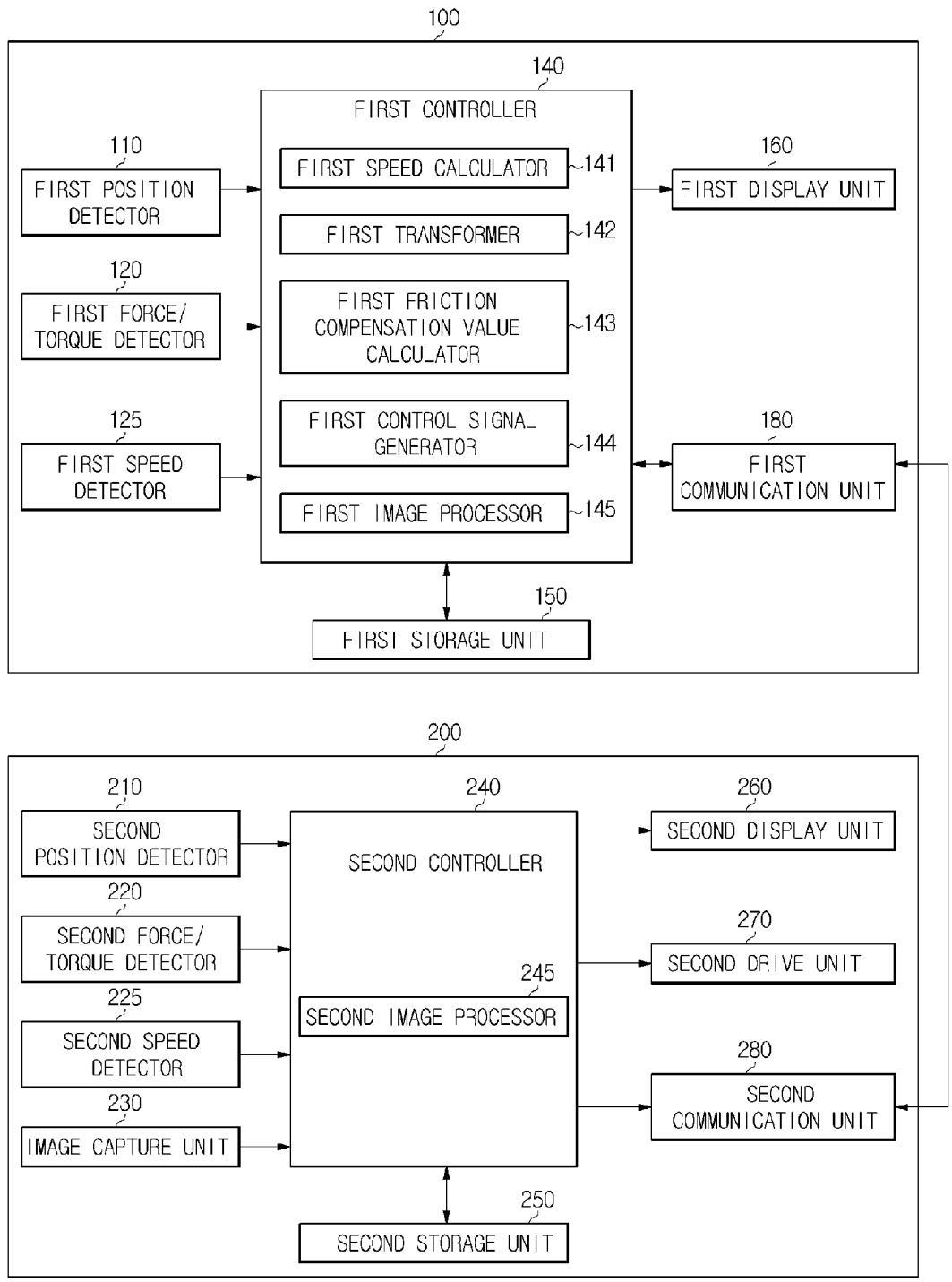
FIG. 2 is a diagram illustrating an example of a control configuration of a master device and a slave device in a surgical robot.

Each of the robot arms 20 may include a second end effector 203, a plurality of second links 201, a plurality of second joints 202, and second detectors (not shown in FIG. 1, but see the second position detector 210, the second force/torque detector 220, and the second speed detector 225 in FIG. 2).

The second end effector 203 is provided at a distal end of the second link 201 for performing a procedure on a patient P. Examples of the second end effector 203 may include an endoscope and a surgical tool. The surgical tool may include tools for resecting, cutting, coagulating, and washing.

Each second joint 202 may be any one of a fixed joint, a revolute joint that rotates about a designated one of X-, Y-, and Z-axes, and a prismatic joint that moves along a designated one of X-, Y-, and Z-axes. The second joint 202 may have at least 1 DOF.

The second joint 202 may be provided with a second drive unit (not shown in FIG. 1, but see the second drive unit 270 in FIG. 2). The second drive unit 270 may apply a driving power to the second joint 202 in response to a control signal received from the master device 100. The second drive unit 270, may be, for example, any one of a motor, a vacuum pump, and a hydraulic pump. In the following description, a motor as the second drive unit 270 will be described by way of example.

The second detectors 210, 220, and 225 may be provided at each second joint 202 to detect data regarding the state of the second joint 202. The second detectors 210, 220, and 225 may include a second force/torque detector 220 to detect a force/torque applied to the second joint 202, a second position detector 210 to detect a position of the second joint 202, and a second speed detector 225 to detect a speed of the second joint 202. The second speed detector 225 may be omitted depending on the kind of a position sensor used as the second position detector 210

Next, examples of a control configuration of the surgical robot and a friction compensation method for the surgical robot will be described with reference to FIGS. 2 to 9.

Prior to describing the examples, terms and symbols that will be used in the following description will be briefly described.

Variables associated with the input unit 10 of the master device 100 may be represented with regard to a joint space and a task space. Hereinafter, the joint space of the input unit 10 is referred to as a 'first joint space' and is denoted by '$Q_m$'. If the number of the first joints 102 provided in the input unit 10 is N, the first joint space $Q_m$ is an N-dimensional space.

Variables associated with the robot arm 20 of the slave device 200 may be represented with regard to a joint space and a task space. Hereinafter, the joint space of the robot arm 20 is referred to as a 'second joint space' and is denoted by '$Q_s$'. If the number of the second joints 202 provided in the robot arm 20 is n, the second joint space $Q_s$ is an n-dimensional space.

A task space is a common space of both the input unit 10 and the robot arm 20, and is referred to as 'Cartesian space'. Hereinafter, the task space is denoted by 'W'. The task space W is a 6-dimensional space having 3 translational DOFs (positions on X-, Y- and Z-axes) of a rigid body, and 3 rotational DOFs (inclination angles relative to the respective axes) of the rigid body.

FIG. 2 is a diagram illustrating an example of a control configuration of the master device 100 and the slave device 200 in the surgical robot. The surgical robot illustrated in FIG. 2 compensates for friction of the second joint 202 of the robot arm based on a speed of the input unit 10 when the input 10 performs motion. The speed of the input unit 10 may correspond to a speed of the first joint 102.

The master device 100 may generate a control signal to control the robot arm of the slave device 200 to track the motion of the input unit 10, and may transmit the control signal to the slave device 200. The control signal transmitted from the master device 100 to the slave device 200 may be a control signal to which a friction compensation value to compensate for friction of the second joint 202 provided at the robot arm is applied. That is, the control signal may be generated based on the friction compensation value. The master device 100, as illustrated in FIG. 2, may include the first position detector 110, the force/torque detector 120, the first speed detector 125, a first controller 140, a first storage unit 150, a first display unit 160, and a first communication unit 180.

The first position detector 110 may detect a position (a rotation angle) of the first joint 102. The first position detector 110 may serve as a position sensor. The position sensor may be, for example, a potentiometer or an encoder.

The first force/torque detector 120 may detect a force/torque applied to the first joint 102. The first force/torque detector 120 may be a force/torque sensor.

The first speed detector 125 may detect a speed of the first joint 102. The first speed detector 125 may be a speed sensor. However, the first speed detector 125 may be omitted if a speed of the first joint 102 is calculated by differentiating a position signal detected by the first position detector 110.

The first controller 140 may process image data received from the slave device 200. In addition, the first controller 140 may calculate a friction compensation value to compensate for friction of the second joint 202 of the robot arm based on a speed of the input unit 10, and may generate a control signal to which the calculated friction compensation value is applied. That is, the first controller 140 may generate the control signal based on the calculated friction compensation value. The generated control signal may be transmitted to the robot arm of the slave device 200.

The first controller 140 may include a first speed calculator 141, a first transformer 142, a first friction compensation value calculator 143, a first control signal generator 144, and a first image processor 145.

The first speed calculator 141 may calculate a speed of the first joint 102 of the input unit 10 based on a position signal detected by the first position detector 110. For example, a speed of the first joint 102 may be calculated by differentiating a position signal detected by the first position detector 110. The calculated speed of the first joint 102 is a speed in the first joint space $Q_m$. In the following description, the speed of the first joint 102 in the first joint space $Q_m$ is denoted by '$\dot{q}_m$'. Although the above description describes calculating the speed of the first joint 102 based on the position signal of the first joint 102 by way of example, the speed detector 125 may be used to detect the speed of the first joint 102. When the speed detector 125 is provided, the first speed calculator 141 of the first controller 140 may be omitted. The first transformer 142 may transform the speed $\dot{q}_m$ of the first joint 102 in the first joint space $Q_m$ into a speed $v_m$ of the first end effector 103 in the task space W, and in turn may transform the speed $v_m$ of the first end effector 103 in the task space W into a speed $\dot{q}_{m|s}$ in the second joint space $Q_s$. The speed $\dot{q}_{m|s}$ is a target speed of the second joint 202.

As described above, if the number of the first joints 102 is N, the first joint space $Q_m$ is an N-dimensional space. Likewise, if the number of the second joints 202 is n, the second joint space $Q_s$ is an n-dimensional space. The task space W is a 6-dimensional space representing 6 degrees of freedom of a rigid body (3 translational DOFs and 3 rotational DOFs). To represent a speed of the first end effector in the joint space with respect to a speed of the second end effector in the joint space, transformation between the speeds in the respective joint spaces $Q_m$ and $Q_s$ may be necessary.

To transform the speed $\dot{q}_m$ of the first joint 102 in the first joint space $Q_m$ into the speed $v_m$ of the first end effector 103 in the task space W, the first transformer 142 may use the Jacobian matrix $J_m$ of the input unit 10. The Jacobian matrix $J_m$ maps the speed $\dot{q}_m$ of the first joint 102 in the first joint space $Q_m$ to the speed $v_m$ of the first end effector 103 in the task space W. That is, $v_m = J_m \dot{q}_m$. The speed $v_m$ of the first end effector 103 is a target speed that the second end effector 203 will track. To transform the speed $v_m$ of the first end effector 103 into the speed $\dot{q}_{m|s}$ in the second joint space $Q_s$, the first transformer 142 may use an inverse matrix $J_s^{-1}$ or a pseudo-inverse matrix of the Jacobian matrix $J_s$ of the robot arm. The transformation equation may be represented by $\dot{q}_{m|s} = J_s^{-1} v_m = J_s^{-1} J_m \dot{q}_m$. Accordingly, $\dot{q}_{m|s}$ output from the first transformer 142 is not only a speed of the first end effector 103 with respect to the second joint space $Q_s$, but also a target speed of the second joint 202 of the robot arm.

The first friction compensation value calculator 143 may calculate a friction compensation value $C_s$ to be applied to the second joint 202 of the robot arm based on a speed provided by the first transformer 142, i.e., the speed $\dot{q}_{m|s}$ of the first end effector 103 with respect to the second joint space $Q_s$. The friction compensation value $C_s$ may be calculated using Equation 1 below.

$$C_s = b_s \dot{q}_{m|s} \qquad (1)$$

In Equation 1, terms having a subscript 's' are associated with the slave device 200, and terms having a subscript 'm' are associated with the master device 100. That is, in Equation 1, $C_s$ denotes a friction compensation value to be applied to the second joint 202 of the robot arm. In addition, $b_s$ denotes a friction coefficient of the second joint 202, and $\dot{q}_{m|s}$ denotes a speed of the first end effector 103 with respect to the second joint space $Q_s$, i.e., a target speed of the second joint 202. If one second joint 202 is present, the friction coefficient $b_s$ may be a scalar value. If a plurality of second joints 202 are present, the friction coefficient $b_s$ may be a diagonal matrix consisting of friction coefficients of the respective second joints 202. The friction coefficient $b_s$ may be a prestored or estimated value.

The first control signal generator 144 generates a control signal to which a friction compensation value is applied based on an operational state of the robot arm. The friction compensation value may be a friction compensation value calculated by the first friction compensation value calculator 143. For example, the friction compensation value may be a friction compensation value calculated based on a kinetic friction of the second joint 202, or a friction compensation value calculated based on a maximum stationary friction of the second joint 202.

More specifically, if an operational state of the robot arm is not a stationary state, the first control signal generator 144 may generate a control signal to which is applied the friction compensation value calculated based on the kinetic friction of the second joint 202.

If an operational state of the robot arm is a stationary state, the first control signal generator 144 may generate a control signal to which is applied a friction compensation value calculated based on a maximum stationary friction of the second joint 202. The sign of the friction compensation value may be determined based on the sign of the target speed $\dot{q}_{m|s}$ of the second joint 202. The sign of the target speed $\dot{q}_{m|s}$ of the second joint 202 is determined based on a motion direction of the input unit 10. Accordingly, if the motion direction of the input unit 10 is a positive direction, the sign of the friction compensation value is positive (+). If the motion direction of the input unit 10 is a negative direction, the sign of the friction compensation value is negative (−).

The control signal to which the friction compensation value is applied may be generated based on the equation of motion of the robot arm. The equation of motion of the robot arm is given by Equation 2 below.

$$m_s \ddot{q}_s = -b_s \dot{q}_s + C_s + F_s + F_e \qquad (2)$$

In Equation 2, $b_s \dot{q}_s$ denotes friction applied to the second joint 202 of the robot arm. The reason why the sign of $b_s \dot{q}_s$ is negative is that friction applied to the second joint 202 of the robot arm is opposite to a motion direction of the robot arm. In Equation 2, $C_s$ denotes a friction compensation value calculated by the first friction compensation value calculator 143, and $F_s$ denotes a control signal to be transmitted to the robot arm. $F_e$ denotes a force applied to the robot arm via interaction with the external environment. $F_s$ refers to a control signal to which a friction compensation value is not applied, and may be represented by Equation 3 below.

$$F_s = k_v(\dot{q}_{m|s} - \dot{q}_s) + k_p(q_{m|s} - q_s) \qquad (3)$$

In Equation 3, $k_v$ and $k_p$ denote control gains, and $\dot{q}_{m|s}$ denotes a speed of the first end effector 103 with respect to the second joint space $Q_s$, i.e., a target speed of the second joint 202. In addition, $\dot{q}_s$ denotes a speed of the second joint 202 in the second joint space $Q_s$, $q_{m|s}$ denotes a position of the first end effector 103 with respect to the second joint space $Q_s$, and $q_s$ denotes a position of the second joint 202 in the second joint space $Q_s$. If friction compensation is not performed on the second joint 202, the robot arm performs motion to track a position and speed of the first end effector 103 of the input unit 10 in response to the control signal $F_s$ defined by Equation 3.

As described above, the first controller 140 may generate a control signal to which a friction compensation value is applied based on Equation 2 and Equation 3. The generated control signal may be transmitted to the slave device 200 via the first communication unit 180. Thereafter, the control signal to which a friction compensation value is applied is transmitted to the second drive unit 270 provided at the second joint 202 of the robot arm. The second drive unit 270 is driven in response to the control signal to move or rotate the second joint 202.

The first image processor 145 may process image data received from the slave device 200, and display the processed image data via the first display unit 160. Examples of image processing performed by the first image processor 145 may include expansion, reduction, movement, and rotation of an image, image editing, and image filtering. Image processing by the first image processor 145 may be omitted as occasion demands.

The first storage unit 150 may store data or algorithms required to calculate a friction compensation value, or data or algorithms required to generate a control signal to which a friction compensation value is applied. The first storage unit 150 may be any one or any combination of a nonvolatile memory device, such as a Read-Only Memory (ROM), Programmable Read-Only Memory (PROM), Erasable Programmable Read-Only Memory (EPROM), and flash memory, or a volatile memory device such as a Random-Access Memory (RAM), or a storage medium, such as a hard disc or an optical disc. However, the first storage unit 150 is not limited to the above examples, and the first storage unit 150 may be any type of storage unit known to one of ordinary skill in the art.

The first communication unit 180 is operated in cooperation with a second communication unit 280 of the slave device 200, and may transmit a control signal generated by the first control signal generator 144 to the slave device 200, or may receive image data or data regarding an operational state of the robot arm from the slave device 200.

The slave device 200 may operate the robot arm in response to a control signal received from the master device 100. The slave device 200, as illustrated in FIG. 2, may include an image capture unit 230, the second position detector 210, the second force/torque detector 220, the second speed detector 225, a second controller 240, a second storage unit 250, the second display unit 260, the second drive unit 270, and the second communication unit 280.

The second position detector 210 may detect a position (a rotation angle) of the second joint 202 provided at the robot arm. The second position detector 210 may serve as a position sensor. The position sensor, for example, may be a potentiometer or an encoder.

The second force/torque detector 220 may detect a force/torque applied to the second joint 202. The second force/torque detector 220 may be a force/torque sensor.

The second speed detector 225 may detect a speed of the second joint 202. The second speed detector 225 may be a speed sensor. However, the second speed detector 225 may be omitted if a speed of the second joint 202 is calculated by differentiating a position signal detected by the second position detector 210.

The image capture unit 230 may capture an image of tissues inside a patient. The image capture unit 230 may be an endoscope, for example, or any other image capture unit known to one of ordinary skill in the art. An image captured by the image capture unit 230 may be subjected to image processing by the second controller 240. The processed image may be displayed via the second display unit 260, or may be transmitted to the master device 100 via the second communication unit 280.

The second controller 240 serves to connect and control components of the slave device 200. The second controller 240 may include a second image processor 245 to perform image processing on an image captured by the image capture unit 230. Examples of image processing may include expansion, reduction, movement, and rotation of an image, image editing, and image filtering. Image processing by the second controller 240 may be omitted as occasion demands.

The second storage unit 250 may store data or algorithms required to control motion of the slave device 200. For example, the second storage unit 250 may store an image captured by the image capture unit 230, or data regarding an operational state of the slave device 200.

The second display unit 260 may display an image captured by the image capture unit 230 or an image processed by the second image processor 245. The second display unit 260 may be, for example, a Liquid Crystal Display (LCD).

The second drive unit 270 may be provided at the second joint 202 of the robot arm, and may be driven in response to a control signal received from the master device 100 to move or rotate the second joint 202. The control signal received from the master device 100 may be a control signal to which a friction compensation value for friction of the second joint 202 is applied.

The second communication unit 280 is operated in cooperation with the first communication unit 180 of the master device 100, and may receive a control signal from the master device 100 to which a friction compensation value is applied, or may transmit an image captured by the image capture unit 230 or data regarding an operational state of the robot arm to the master device 100.

An example of a control configuration of the master device 100 and the slave device 200 in the surgical robot has been described above with reference to FIG. 2. Although FIG. 2 illustrates the case in which the first controller 140 of the master device 100 includes the first speed calculator 141, the first transformer 142, the first friction compensation value calculator 143, and the first control signal generator 144, the example is not limited thereto, and any one or any combination of the above enumerated components may be included in the second controller 240 of the slave device 200.

In one example, the first controller 140 may include only the first speed calculator 141. The first transformer 142, the first friction compensation value calculator 143, and the first control signal generator 144 may be included in the second controller 240 of the slave device 200. The first controller 140 of the master device 100 may calculate a speed $\dot{q}_m$ of the first joint 102 in the first joint space $Q_m$ from a position signal of the first joint 102 detected by the first position detector 110, and transmit the calculated speed $\dot{q}_m$ of the first joint 102 to the slave device 200 via the first communication unit 180. Then, the second controller 240 of the slave device 200 may transform the speed $\dot{q}_m$ of the first joint 102 into the speed $v_m$ of the first end effector 103, calculate the target speed $\dot{q}_{m|s}$ of the second joint 202 based on the transformed speed $v_m$ of the first end effector 103, calculate a friction compensation value based on the target speed $\dot{q}_{m|s}$, generate a control signal to which the calculated friction compensation value is applied, and control the robot arm in response to the generated control signal.

In another example, the first controller 140 may include the first speed calculator 141 and the first transformer 142. The first friction compensation value calculator 143 and the first control signal generator 144 may be included in the second controller 240 of the slave device 200.

In a further example, the first controller 140 may include the first speed calculator 141, the first transformer 142, and the first friction compensation value calculator 143. The first control signal generator 144 may be included in the second controller 240.

Figure 3:
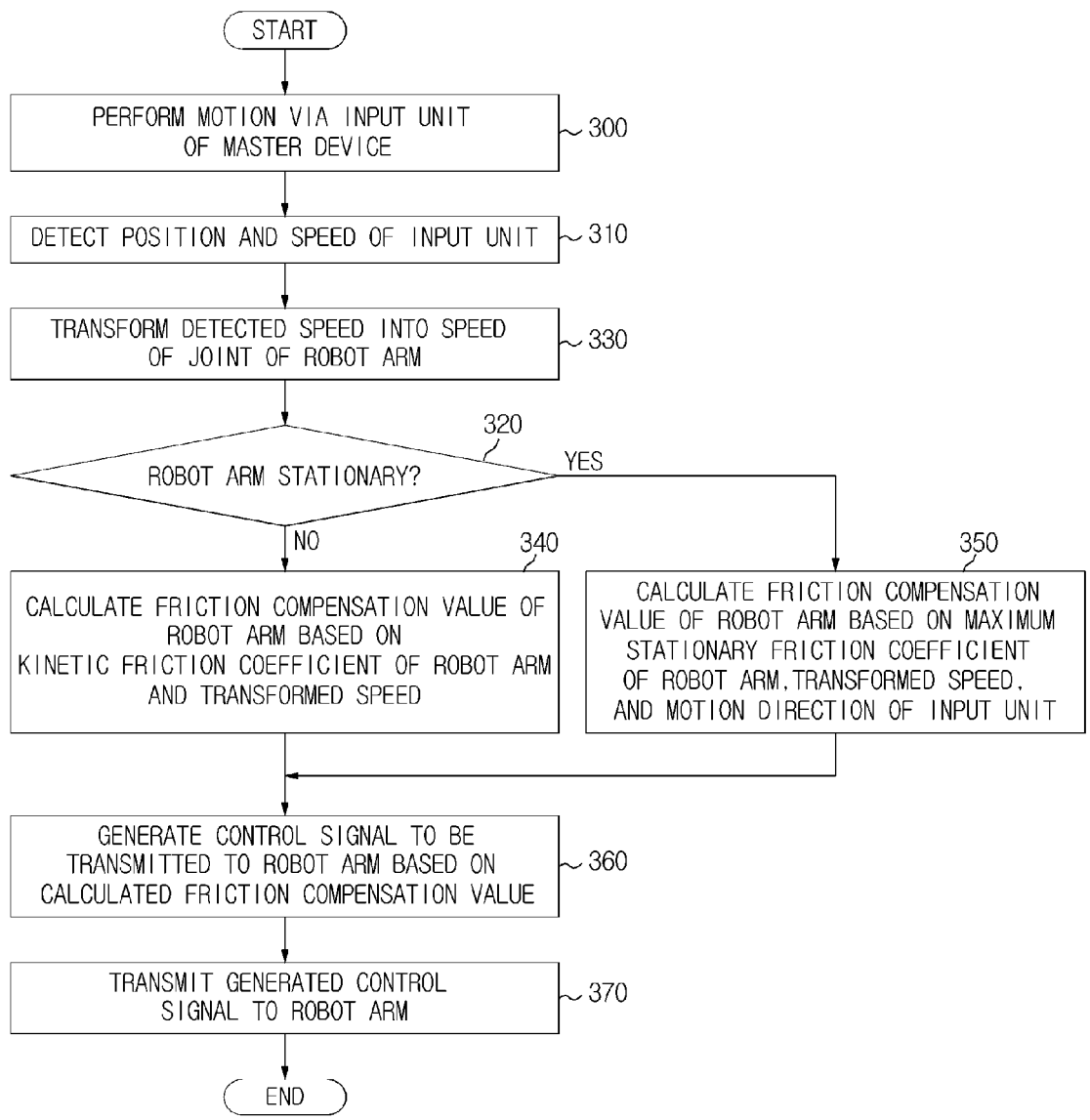
FIG. 3 is a flowchart illustrating an example of a friction compensation method with regard to a robot arm that is performed by the surgical robot of FIG. 2.

FIG. 3 is a flowchart illustrating an example of a friction compensation method with regard to the robot arm that is performed by the surgical robot of FIG. 2. If the input unit 10 of the master device 100 performs motion (300), a position and speed of the input unit 10 are detected (310). That is, a position and speed of the first joint 102 provided at the input unit 10 are detected. The position of the first joint 102 may be detected by the first position detector 110, and the speed of the first joint 102 may be calculated by differentiating a position signal of the first joint 102 detected by the first position detector 110.

To calculate a friction compensation value based on the speed of the first joint 102 of the input unit 10 as will be described below, the speed of the first joint 102 detected in Operation 310 may be transformed into a speed of the second joint 202 of the robot arm (330). The transformation may use the Jacobian matrix $J_m$ of the input unit 10, or the inverse matrix $J_s^{-1}$ or pseudo-inverse matrix of the Jacobian matrix $J_s$ of the robot arm.

The above Operation 330 will be described below in more detail. First, the speed $v_m$ of the first end effector 103 in the task space W is calculating by multiplying the speed $\dot{q}_m$ of the first joint 102 in the first joint space $Q_m$ by the Jacobian matrix $J_m$ of the master device 100. Next, the speed $\dot{q}_{m|s}$ of the first end effector 103 with respect to the second joint space $Q_s$ is calculated by multiplying the speed $v_m$ of the first end effector 103 in the task space W by the inverse matrix $J_s^{-1}$ or pseudo-inverse matrix of the Jacobian matrix $J_s$ of the robot arm. The calculated speed $\dot{q}_{m|s}$ is a target speed of the second joint 202.

Thereafter, whether or not an operational state of the robot arm is a stationary state may be determined based on data regarding the operational state of the robot arm (320). Then, a friction compensation value to be applied to the second joint 202 of the robot arm may be calculated depending on the result of Operation 320 (340, and 350).

More specifically, if the result of Operation 320 shows that the operational state of the robot arm is a stationary state (Yes in Operation 320), a friction compensation value to be applied to the second joint 202 of the robot arm may be calculated based on the speed of the first joint 102 and a maximum stationary friction of the second joint 202 (350). The sign of the friction compensation value may be determined based on the sign of the target speed $\dot{q}_{m|s}$ of the second joint 202. However, since the sign of the target speed $\dot{q}_{m|s}$ of the second joint 202 is determined based on a motion direction of the input unit 10, it will be appreciated that the sign of the friction compensation value is also determined based on the motion direction of the input unit 10.

If the result of Operation 320 shows that the operational state of the robot arm is not a stationary state (No in Operation 320), a friction compensation value to be applied to the second joint 202 of the robot arm may be calculated based on the speed of the first joint 102 and a kinetic friction of the second joint 202 (340).

More specifically, a friction compensation value $C_s$ to be applied to the second joint 202 of the robot arm may be calculated based on the speed $\dot{q}_{m|s}$ of the first end effector 103 with respect to the second joint space $Q_s$ (340). The friction compensation value $C_s$ may be calculated by multiplying the speed $\dot{q}_{m|s}$ of the first end effector 103 with respect to the second joint space $Q_s$ by a friction coefficient $b_s$ of the second joint 202 as represented by Equation 1, wherein the friction coefficient $b_s$ may be a kinetic friction coefficient of the second joint 202.

Once the friction compensation value to be applied to the second joint 202 of the robot arm is calculated, a control signal to which the calculated friction compensation value is applied is generated (360). The control signal to which the friction compensation value is applied may be generated based on the equation of motion of the robot arm as represented by Equation 2. That is, the control signal to which the calculated friction compensation value is applied may be generated by adding the friction compensation value $C_s$ calculated using Equation 1 to a control signal $F_s$ to which a friction compensation value is not applied.

If the result of Operation 320 shows that the operational state of the robot arm is a stationary state (Yes in Operation 320), instead of the friction compensation value $C_s$ calculated in Operation 340, a friction compensation value Cs may be calculated by multiplying the speed $\dot{q}_{m|s}$ of the first end effector 103 with respect to the second joint space $Q_s$ by a friction coefficient $b_s$ of the second joint 202 as represented by Equation 1, wherein the friction coefficient $b_s$ may be a maximum stationary friction coefficient of the second joint 202 (350).

The control signal to which the friction compensation value is applied may be transmitted to the slave device 200 via the first communication unit 180 of the master device 100 (370). If the second communication unit 280 of the slave device 200 receives the control signal to which the friction compensation value is applied, the received control signal is transmitted to the second drive unit 270 of the second joint 202, and the second drive unit 270 drives the second joint 202 in response to the control signal.

As described above, an intention of an operator may be accurately reflected in control of the robot arm by compensating for friction of the robot arm based on the speed of the input unit 10.

Further, motion of the robot arm may be controlled to naturally track motion of the input unit 10 regardless of whether or not the robot arm has a low-performance speed sensor, or the robot arm does not have a speed sensor.

Furthermore, it may be unnecessary to provide the robot arm with a speed sensor to detect a speed of the robot arm, which may reduce production costs and ensure easier design of the robot arm.

Figure 4:
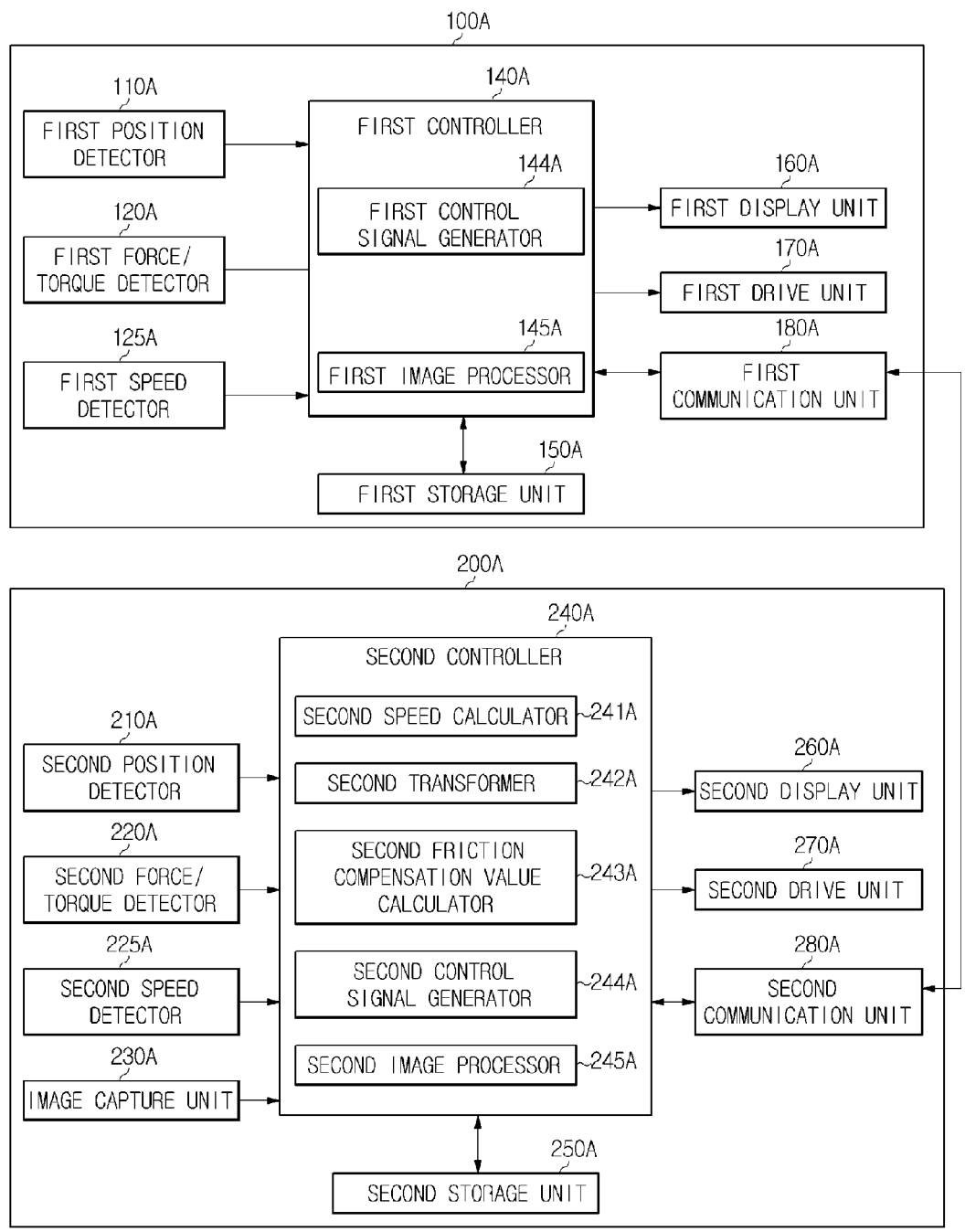
FIG. 4 is a diagram illustrating another example of a control configuration of a master device and a slave device in a surgical robot.

FIG. 4 is a diagram illustrating another example of a control configuration of a master device 100A and a slave device 200A in a surgical robot.

The surgical robot illustrated in FIG. 4 compensates for friction of the first joint 102 provided at the input unit 10 of the master device 100A based on a speed of the robot arm if the robot arm provided at the slave device 200A performs motion. The speed of the robot arm may correspond to a speed of the second joint 202.

The master device 100A may generate a control signal to control the robot arm of the slave device 200A to track motion of the input unit 10, and provide the control signal to the slave device 200A. The master device 100A, as illustrated in FIG. 4, may include a first position detector 110A, a first force/torque detector 120A, a first speed detector 125A, a first controller 140A, a first storage unit 150A, a first display unit 160A, a first drive unit 170A, and a first communication unit 180A.

The first position detector 110A may detect a position (a rotation angle) of the first joint 102. The first position detector 110A may be a position sensor. The position sensor may be a potentiometer or an encoder.

The first force/torque detector 120A may detect a force/torque applied to the first joint 102. The first force/torque detector 120A may be a force/torque sensor.

The first speed detector 125A may detect a speed of the first joint 102. The first speed detector 125A may be a speed sensor. However, the first speed detector 125A may be omitted if a speed of the first joint 102 is calculated by differentiating a position signal detected by the first position detector 110A.

The first controller 140A includes a first control signal generator 144A and a first image processor 145A.

The first control signal generator 144A generates a control signal to control the robot arm to track motion of the input unit 10. The generated control signal is transmitted to the slave device 200A via the first communication unit 180A.

The first image processor 145A may process image data received from the slave device 200A and display the processed image data via the first display unit 160A. Examples of image processing performed by the first image processor 145A may include expansion, reduction, movement, and rotation of an image, image editing, and image filtering. The first image processor 145A may perform any one or any combination of these image processing operations. However, image processing may be omitted as occasion demands.

The first storage unit 150A may store data or algorithms required for the first controller 140A to generate a control signal. The first storage unit 150A may be any one or any combination of a nonvolatile memory device, a volatile memory device, and a storage medium.

The first drive unit 170A is provided at the first joint 102 of the input unit 10. The first drive unit 170A is driven in response to a control signal received from the slave device 200A to move or rotate the first joint 102. The control signal received from the slave device 200A may be a control signal to which a friction compensation value for the first joint 102 is applied.

The first communication unit 180A is operated in cooperation with a second communication unit 280A of the slave device 200A. The first communication unit 180A may transmit data regarding an operational state of the input unit 10 or a control signal generated by the first control signal generator 144A to the slave device 200, and may receive image data or a control signal to which a friction compensation value for the first joint 102 is applied from the slave device 200A.

The slave device 200A operates the robot arm in response to a control signal received from the master device 100A. In addition, if the robot arm is moved by an external force, the slave device 200A may calculate a friction compensation value to be applied to the first joint 102 of the input unit 10 based on a speed of the robot arm, and may transmit a control signal to which the calculated friction compensation value is applied to the master device 100A. The slave device 200A, as illustrated in FIG. 4, includes a second position detector 210A, a second force/torque detector 220A, a second speed detector 225A, an image capture unit 230A, a second controller 240A, a second storage unit 250A, a second display unit 260A, a second drive unit 270A, and a second communication unit 280A.

The second position detector 210A may detect a position (a rotation angle) of the second joint 202 provided at the robot arm. The second position detector 210A may serve as a position sensor. The position sensor, for example, may be a potentiometer or an encoder.

The second force/torque detector 220A may detect a force/torque applied to the second joint 202. The second force/torque detector 220A may be a force/torque sensor.

The second speed detector 225A may detect a speed of the second joint 202. The second speed detector 225A may be a speed sensor. However, the second speed detector 225A may be omitted if a speed of the second joint 202 is calculated by differentiating a position signal detected by the second position detector 210A.

The image capture unit 230A may capture an image of tissues inside a patient. The image capture unit 230A may be an endoscope, for example, or any other image capture device known to one of ordinary skill in the art. An image captured by the image capture unit 230A may be subjected to image processing by the second controller 240A. The processed image may be displayed via the second display unit 260A, or may be transmitted to the master device 100A via the second communication unit 280A.

The second controller 240A may process image data received from the image capture unit 230. If the robot arm performs a motion, the second controller 240A may calculate a friction compensation value to compensate for friction of the first joint 102 provided at the input unit 10 of the master device 100A based on a speed of the robot arm, and generate a control signal to which the calculated friction compensation value is applied. The generated control signal may be transmitted to the master device 100A.

More specifically, the second controller 240A may include a second speed calculator 241A, a second transformer 242A, a second friction compensation value calculator 243A, a second control signal generator 244A, and a second image processor 245A.

The second speed calculator 241A may calculate a speed of the second joint 202 based on a position signal of the second joint 202 detected by the second position detector 210A. For example, a speed $\dot{q}_s$ of the second joint 202 may be calculated by differentiating a position signal detected by the second position detector 210A. The calculated speed $\dot{q}_s$ of the second joint 202 is a speed in the second joint space $Q_s$. Although FIG. 4 describes the case of calculating the speed $\dot{q}_s$ of the second joint 202 from the position signal of the second joint 202 by way of example, the second speed detector 225A may be used to detect a speed of the second joint 202. When the second speed detector 225A is provided, the second speed calculator 241A of the second controller 240A may be omitted.

The second transformer 242A may transform a variable in the second joint space $Q_s$ into a variable in the task space W, and in turn transform the variable in the task space W into a variable in the first joint space $Q_m$. More specifically, the second transformer 242A may transform the speed $\dot{q}_s$ of the second joint 202 in the second joint space $Q_s$ into a speed $v_s$ of the second end effector 203 in the task space W, and in turn may transform the speed $v_s$ of the second end effector 203 in the task space W into a speed of the first joint 102 in space $Q_m$. As described above, transformation between the speeds in the first joint space $Q_m$ and the second joint space $Q_s$ may be necessary using the speed in the task space W as a parameter.

To transform the variable in the second joint space $Q_s$ into the variable in the task space W, the second transformer 242A may use the Jacobian matrix $J_s$ of the robot arm. The Jacobian matrix $J_s$ of the robot arm maps the speed $\dot{q}_s$ of the second joint 102 in the second joint space $Q_s$ to the speed $v_s$ of the second end effector 203 in the task space W. That is, $v_s = J_s \dot{q}_s$. In addition, the speed $v_s$ of the second end effector 203 in the task space W may be transformed into a speed $\dot{q}_{s|m}$ of the first joint space $Q_m$ using an inverse matrix $J_m^{-1}$ or pseudo-inverse matrix of the Jacobian matrix $J_m$. The transformation equation may be represented by $\dot{q}_{s|m} = J_m^{-1} v_s = J_m^{-1} J_s \dot{q}_s$. Accordingly, $\dot{q}_{s|m}$ output from the second transformer 242A is not only a speed of the second end effector 203 with respect to the first joint space $Q_m$, but also a target speed of the first joint 102 provided at the input unit 10.

The second friction compensation value calculator 243A may calculate a friction compensation value $C_m$ to compensate for friction of the first joint 102 based on a speed provided by the second transformer 242A, i.e., the speed $\dot{q}_{s|m}$ of the second end effector 203 with respect to the first joint space $Q_m$. The friction compensation value $C_m$ may be calculated using Equation 4 below.

$$C_m = b_m \dot{q}_{s|m} \tag{4}$$

Among terms represented in Equation 4, terms having a subscript 's' are associated with the slave device 200A, and terms having a subscript 'm' are associated with the master device 100A. That is, in Equation 4, $C_m$ denotes a friction compensation value to be applied to the first joint 102 of the input unit 10. In addition, $b_m$ denotes a friction coefficient of the first joint 102, and $\dot{q}_{s|m}$ denotes a speed of the second end effector 203 with respect to the first joint space $Q_m$. If one first joint 102 is present, the friction coefficient $b_m$ may be a scalar value. If a plurality of first joints 102 are present, the friction coefficient $b_m$ may be a diagonal matrix consisting of friction coefficients of the respective first joints 102. The friction coefficient $b_m$ may be a prestored or estimated value.

The second control signal generator 244A generates a control signal to which a friction compensation value is applied based on an operational state of the input unit 10. The friction compensation value may be a friction compensation value calculated by the second friction compensation value calculator 243A. For example, the friction compensation value may be a friction compensation value calculated based on a kinetic friction of the first joint 102, or a friction compensation value calculated based on a maximum stationary friction of the first joint 102.

More specifically, if an operational state of the input unit 10 is not a stationary state, the second control signal generator 244A may generate a control signal to which is applied the friction compensation value calculated based on the kinetic friction of the first joint 102.

If an operational state of the input unit 10 is a stationary state, the second control signal generator 244A may generate a control signal to which is applied a friction compensation value calculated based on a maximum stationary friction of the first joint 102. The sign of the friction compensation value may be determined based on the sign of the speed output from the second transformer 242A, i.e., the sign of the target speed $\dot{q}_{s|m}$ of the first joint 102. The sign of the target speed $\dot{q}_{s|m}$ of the first joint 202 is determined based on a motion direction of the robot arm. Accordingly, if the motion direction of the robot arm is a positive direction, the sign of the friction compensation value is positive (+). If the motion direction of the robot arm is a negative direction, the sign of the friction compensation value is negative (−).

The control signal to which the friction compensation value is applied may be generated based on the equation of motion of the input unit 10. The equation of motion of the input unit 10 is given by Equation 5 below.

$$m_m \ddot{q}_m = -b_m \dot{q}_m + C_m + \tau_m + \tau_h \tag{5}$$

In Equation 5, $b_m \dot{q}_m$ denotes friction applied to the first joint 102 of the input unit 10. The reason why the sign of $b_m \dot{q}_m$ is negative is that friction applied to the first joint 102 of the input unit 10 is opposite to a motion direction of the input unit 10. In Equation 5, $C_m$ denotes a friction compensation value calculated by the second friction compensation value calculator 243A, and $\tau_m$ denotes a control signal to be transmitted to the input unit 10. $\tau_h$ denotes a force applied to the input unit 10 via interaction with a person. $\tau_m$ denotes a control signal to which a friction compensation value is not applied, and may be represented by Equation 6a below.

$$\tau_m = k_v(\dot{q}_{s|m} - \dot{q}_m) + k_p(q_{s|m} - q_m) \tag{6a}$$

In Equation 6a, $k_v$ and $k_p$ denote control gains, and $\dot{q}_{s|m}$ denotes a speed of the second end effector 203 in the first joint space $Q_m$, i.e., a target speed of the first joint 102. In addition, $\dot{q}_m$ denotes a speed of the first joint 102 in the first joint space $Q_m$, $q_{s|m}$ denotes a position of the second end effector 203 with respect to the first joint space $Q_m$, and $q_m$ denotes a position of the first joint 102 in the first joint space $Q_m$. The input unit 10 performs motion to track a position and speed of the second end effector 103 depending on the control signal $\tau_m$. As a result, the operator D may indirectly experience interaction between the robot arm and the external environment.

Another way of calculating the control signal $\tau_m$ may be represented by Equation 6b below.

$$\tau_m = J_m^T(k_v(v_s-v_m)+k_p(x_s-x_m)) \tag{6b}$$

Equation 6b describes a method of calculating a force to be applied to the input unit 10 in the task space W by multiplying a speed difference $v_s-v_m$ and a position difference $x_s-x_m$ of the input unit 10 and the robot arm in the task space W by the control gains $k_v$ and $k_p$, respectively, and then calculating the control signal $\tau_m$ (i.e., a torque) in the first joint space $Q_m$ by multiplying the calculated force by the Jacobian transpose $J_m^T$ of the input unit 10.

As described above, the second controller 240A may generate a control signal $\tau_m+C_m$ to which a friction compensation value is applied based on Equation 5, Equation 6a, and Equation 6b. The generated control signal $\tau_m+C_m$ may be transmitted to the master device 100A via the second communication unit 280A. Thereafter, the control signal $\tau_m+C_m$ to which a friction compensation value is applied is transmitted to the first drive unit 170A provided at the first joint 102 of the input unit 10. The first drive unit 170A is driven in response to the control signal to move or rotate the first joint 102 provided at the input unit 10. By applying the motion of the robot arm to the input unit 10 when the robot arm performs motion due to an external force or for other reasons, it may be possible to allow the operator D who grips the input unit 10 to perceive the motion of the robot arm in a tactile manner.

The second image processor 245A may process image data received from the image capture unit 230A, and display the data via the second display unit 260A.

The second storage unit 250A may store data or algorithms required to calculate a friction compensation value. The second storage unit 250A may be any one or any combination of a nonvolatile memory device, a volatile memory device, and a storage medium.

The second display unit 260A may display an image captured by the image capture unit 230A or an image processed by the second image processor 245A. The second display unit 260A may be, for example, a Liquid Crystal Display (LCD).

The second drive unit 270A may be provided at the second joint 202 of the robot arm, and may be driven in response to a control signal received from the master device 100A to move or rotate the second joint 202.

The second communication unit 280A is operated in cooperation with the first communication unit 180A of the master device 100A, and may receive a control signal from the master device 100A to control the robot arm. In addition, the second communication unit 280A may transmit image data captured by the image capture unit 230A or a control signal to which a friction compensation value is applied based on a speed of the robot arm to the master device 100A.

An example of a control configuration of the master device 100A and the slave device 200A in the surgical robot has been described above with reference to FIG. 4. Although FIG. 4 illustrates the case in which the second controller 240A of the slave device 200A includes the second speed calculator 241A, the second transformer 242A, the second friction compensation value calculator 243A, and the second control signal generator 244A, the example is not limited thereto, and any one or any combination of the above enumerated components may be included in the first controller 140A of the master device 100A.

In one example, the second controller 240A may include only the second speed calculator 241A. The second transformer 242A, the second friction compensation value calculator 243A, and the second control signal generator 244A may be included in the first controller 140A. The second controller 240A of the slave device 200A may calculate a speed $\dot{q}_s$ of the second joint 202 in the second joint space $Q_s$ from a position signal of the second joint 202 detected by the second position detector 210A, and transmit the calculated speed $\dot{q}_s$ of the second joint 202 to the master device 100A via the second communication unit 280A. Then, the first controller 140 of the master device 100A may transform the speed $\dot{q}_s$ of the second joint 202 into the speed $v_m$ of the second end effector 203, calculate the target speed $\dot{q}_{s|m}$ of the first joint 102 based on the transformed speed $v_m$, calculate a friction compensation value based on the target speed $\dot{q}_{s|m}$, generate a control signal to which a friction compensation value is applied, and control the input unit 10 in response to the generated control signal.

In another example, the second controller 240A may include the second speed calculator 241A and the second transformer 242A. The second friction compensation value calculator 243A and the second control signal generator 244A may be included in the first controller 140A of the master device 100A.

Figure 5:
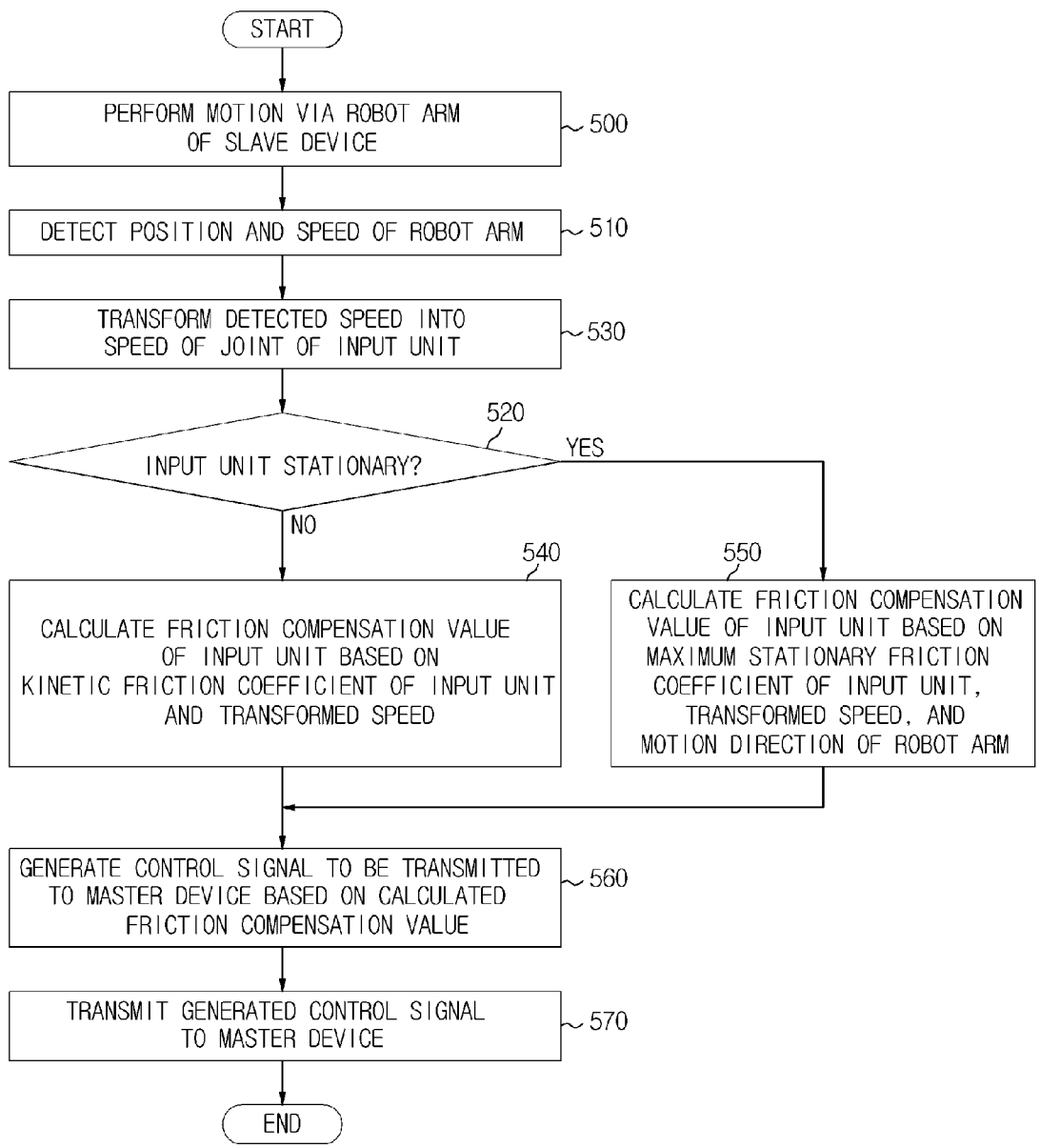
FIG. 5 is a flowchart illustrating an example of a friction compensation method with regard to an input unit that is performed by the surgical robot of FIG. 4.

FIG. 5 is a flowchart illustrating an example of a friction compensation method with regard to the input unit that is performed by the surgical robot of FIG. 4. If the robot arm of the slave device 200A performs motion upon receiving an external force or for other reasons (500), a position and speed of the robot arm are detected (510). That is, a position and speed of the second joint 202 provided at the robot arm are detected. The position of the second joint 202 may be detected by the second position detector 210A, and the speed of the second joint 202 may be calculated by differentiating a position signal of the second joint 202 detected by the second position detector 210A.

To calculate a friction compensation value based on the speed of the second joint 202 of the robot arm as will be described below, the speed of the second joint 202 detected in Operation 520 may be transformed into a speed of the first joint 102 of the input unit 10 (530). The transformation may use the Jacobian matrix $J_s$ of the robot arm, and the inverse matrix $J_m^{-1}$ or pseudo-inverse matrix of the Jacobian matrix $J_m$ of the input unit 10.

The above Operation 530 will be described below in more detail. First, a speed $v_s$ of the second end effector 203 in the task space W is calculated by multiplying the speed $\dot{q}_s$ of the second joint 202 in the second joint space $Q_s$ by the Jacobian matrix $J_s$ of the robot arm. Next, the speed $\dot{q}_{s|m}$ of the second end effector 203 in the first joint space $Q_m$ is calculated by multiplying the speed $v_s$ of the second end effector 203 in the task space W by the inverse matrix $J_m^{-1}$ or pseudo-inverse matrix of the Jacobian matrix $J_m$ of the input unit 10. The calculated speed $\dot{q}_{s|m}$ is a target speed of the first joint 102.

Thereafter, whether or not an operational state of the input unit 10 is a stationary state may be determined based on data regarding the operational state of the input unit 10 (520). Then, a friction compensation value to be applied to the first joint 102 of the input unit 10 may be calculated depending on the result of Operation 520 (540, and 550).

More specifically, if the result of Operation 520 shows that the operational state of the input unit 10 is a stationary state (Yes in Operation 520), a friction compensation value to be applied to the first joint 102 of the input unit 10 may be calculated based on the speed of the second joint 202 of the robot arm and a maximum stationary friction of the first joint 102 (550). The sign of the friction compensation value may be determined based on the sign of the target speed $\dot{q}_{s|m}$ of the first joint 102. Since the sign of the target speed $\dot{q}_{s|m}$ of the first joint 102 is determined based on a motion direction of the robot arm, it will be appreciated that the sign of the friction compensation value is also determined based on the motion direction of the robot arm.

If the result of Operation 520 shows that the operational state of the input unit 10 is not a stationary state (No in Operation 520), a friction compensation value to be applied to the first joint 102 of the input unit 10 may be calculated based on the speed of the second joint 202 of the robot arm and the kinetic friction of the first joint 102 (540).

More specifically, a friction compensation value to be applied to the first joint 102 of the input unit 10 may be calculated based on the speed $\dot{q}_{s|m}$ of the second end effector 203 with respect to the first joint space $Q_m$ (540). The friction compensation value may be calculated by multiplying the speed $\dot{q}_{s|m}$ of the second end effector 203 with respect to the first joint space $Q_m$ by a friction coefficient $b_m$ of the first joint 102 as represented by Equation 4, wherein the friction coefficient $b_m$ may be a kinetic friction coefficient of the first joint 102.

Once the friction compensation value to be applied to the first joint 102 of the input unit 10 is calculated, a control signal to which the calculated friction compensation value is applied may be generated (560). The control signal $\tau_m + C_m$ to which the friction compensation value is applied may be generated by adding the friction compensation value $C_m$ calculated using Equation 4 to a control signal $\tau_m$ to which a friction compensation value is not applied of Equation 6a and Equation 6b.

If the result of Operation 520 shows that the operational state of the input unit 10 is a stationary state (Yes in Operation 520), instead of the friction compensation value $C_m$ calculated in Operation 540, a friction compensation value $C_m$ may be calculated by multiplying the speed $\dot{q}_{s|m}$ of the second end effector 203 with respect to the first joint space $Q_m$ by a friction coefficient $b_m$ of the first joint 102 as represented by Equation 4, wherein the friction coefficient $b_m$ may be a maximum stationary friction coefficient of the first joint 102 (550).

The control signal to which the friction compensation value is applied may be transmitted to the master device 100A via the second communication unit 280A of the slave device 200A (570). If the first communication unit 180A of the master device 100A receives the control signal to which the friction compensation value is applied, the received control signal is transmitted to the first drive unit 170A of the first joint 102, and the first drive unit 170A drives the first joint 102 based on the control signal.

As described above, an external force applied to the robot arm is transmitted to the input unit 10 of the master device 100A by performing friction compensation of the input unit 10 based on a speed of the robot arm. Therefore, the operator D who manipulates the input unit 10 may indirectly perceive a magnitude of the external force applied to the robot arm.

Figure 6:
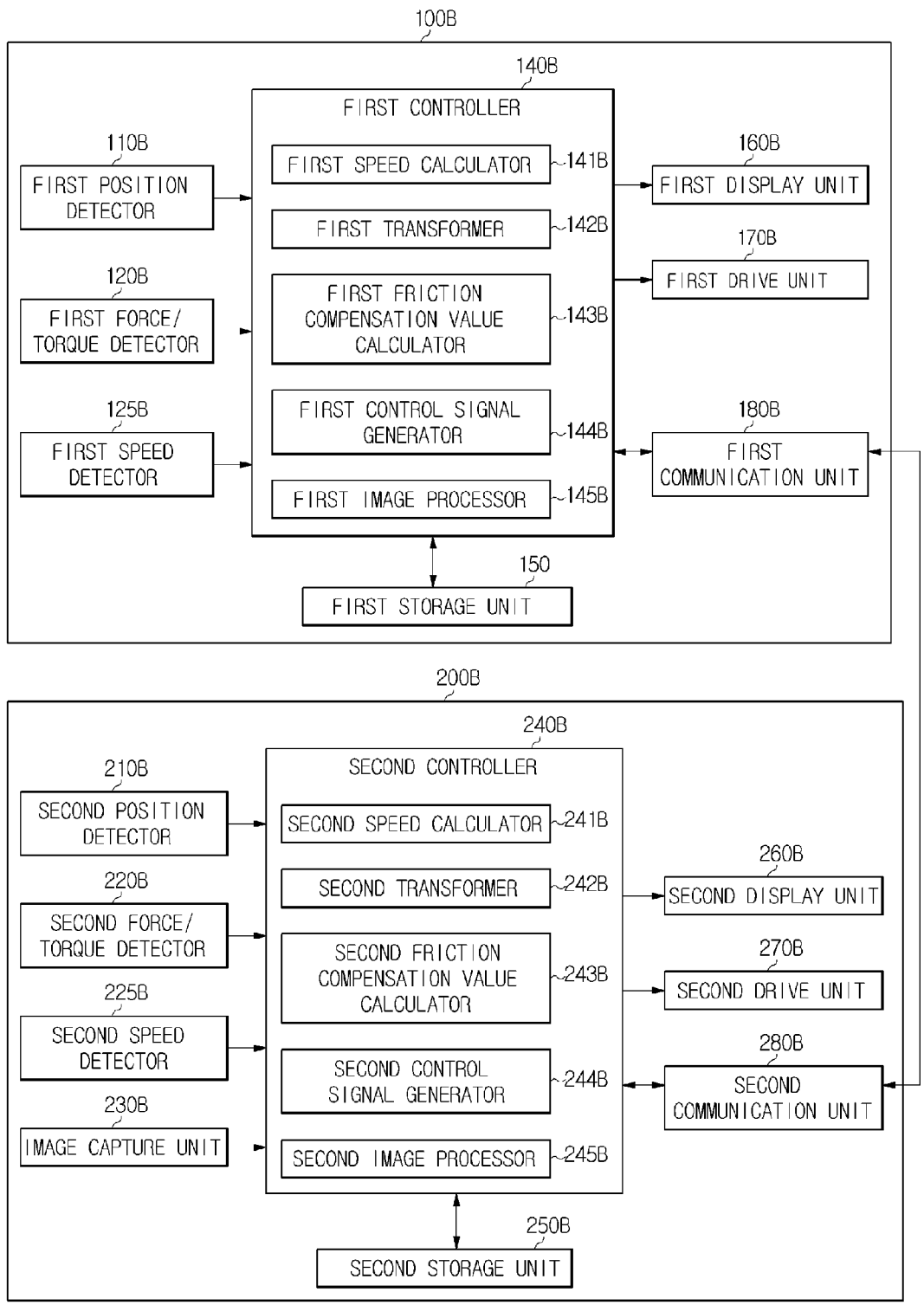
FIG. 6 is a diagram illustrating another example of a control configuration of a master device and a slave device in a surgical robot.

FIG. 6 is a diagram illustrating another example of a control configuration of a master device 100B and a slave device 200B in a surgical robot. The surgical robot illustrated in FIG. 6 compensates for friction of the second joint 202 provided at the robot arm of the slave device 200B based on a speed of the input unit 10 if the input unit 10 provided at the master device 100B performs motion. In addition, if the robot arm performs motion, the surgical robot compensates for friction of the first joint 102 provided at the input unit 10 of the master device 100B based on a speed of the robot arm.

The master device 100B generates a control signal to control the robot arm of the slave device 200B to track motion of the input unit 10, and transmit the control signal to the slave device 200B. The control signal transmitted from the master device 100B to the slave device 200B may be a control signal to which a friction compensation value to compensate for friction of the second joint 202 provided at the robot arm is applied. The friction compensation value may be calculated based on a speed of the input unit 10.

The master device 100B, as illustrated in FIG. 6, may include a first position detector 110B, a first force/torque detector 120B, a first speed detector 125B, a first controller 140B, a first storage unit 150B, a first display unit 160B, a first drive unit 170B, and a first communication unit 180B. Among the above components, the first position detector 110B, the first force/torque detector 120B, the first speed detector 125B, the first controller 140B, the first storage unit 150B, and the first display unit 160B are the same as the corresponding components of the master device 100 illustrated in FIG. 2, and therefore a repeated description thereof will be omitted.

The first speed detector 125B may be omitted if a speed of the first joint 102 is calculated by differentiating a position signal detected by the first position detector 110B.

The first drive unit 170B is provided at the first joint 102 of the input unit 10. The first drive unit 170B may be driven in response to a control signal received from the slave device 200B to move or rotate the first joint 102. The control signal received from the slave device 200B may be a control signal to which a friction compensation value for the first joint 102 of the input unit 10 is applied. The friction compensation value may be calculated based on a speed of the robot arm.

The first communication unit 180B may transmit data regarding an operational state of the input unit 10 or a control signal generated by the master device 100B to the slave device 200B. In addition, the first communication unit 180B may receive data regarding an operational state of the robot arm or control signal generated by the slave device 200B from the slave device 200B.

The slave device 200B may operate the robot arm in response to a control signal received from the master device 100B. In addition, if the robot arm is operated by an external force or for other reasons, the slave device 200B may generate a control signal to apply motion of the robot arm to the input unit 10 of the master device 100B, and may transmit the control signal to the master device 100B. The control signal transmitted from the slave device 200B to the master device 100B may be a control signal to which a friction compensation value to compensate for friction of the first joint 102 provided at the input unit 10 is applied, and the friction compensation value may be calculated based on a speed of the robot arm.

The slave device 200B, as illustrated in FIG. 6, includes a second position detector 210B, a second force/torque detector 220B, a second speed detector 225B, an image capture unit 230B, a second controller 240B, a second storage unit 250B, a second display unit 260B, a second drive unit 270B, and a second communication unit 280B. Among the above components, the second position detector 210B, the second force/torque detector 220B, the second speed detector 225B, the image capture unit 230B, the second controller 240B, the second storage unit 250B, the second display unit 260B and the second drive unit 270B are the same as the corresponding components of the slave device 200A illustrated in FIG. 4, and therefore a repeated description thereof will be omitted.

The second speed detector 225B may be omitted if a speed of the second joint 202 is calculated by differentiating a position signal detected by the second position detector 210B.

The second communication unit 280B may receive data regarding an operational state of the input unit 10 or a control signal generated by the master device 100B from the master device 100B. In addition, the second communication unit 280B may transmit data regarding an operational state of the robot arm or a control signal generated by the slave device 200B to the master device 100B.

Figure 7:
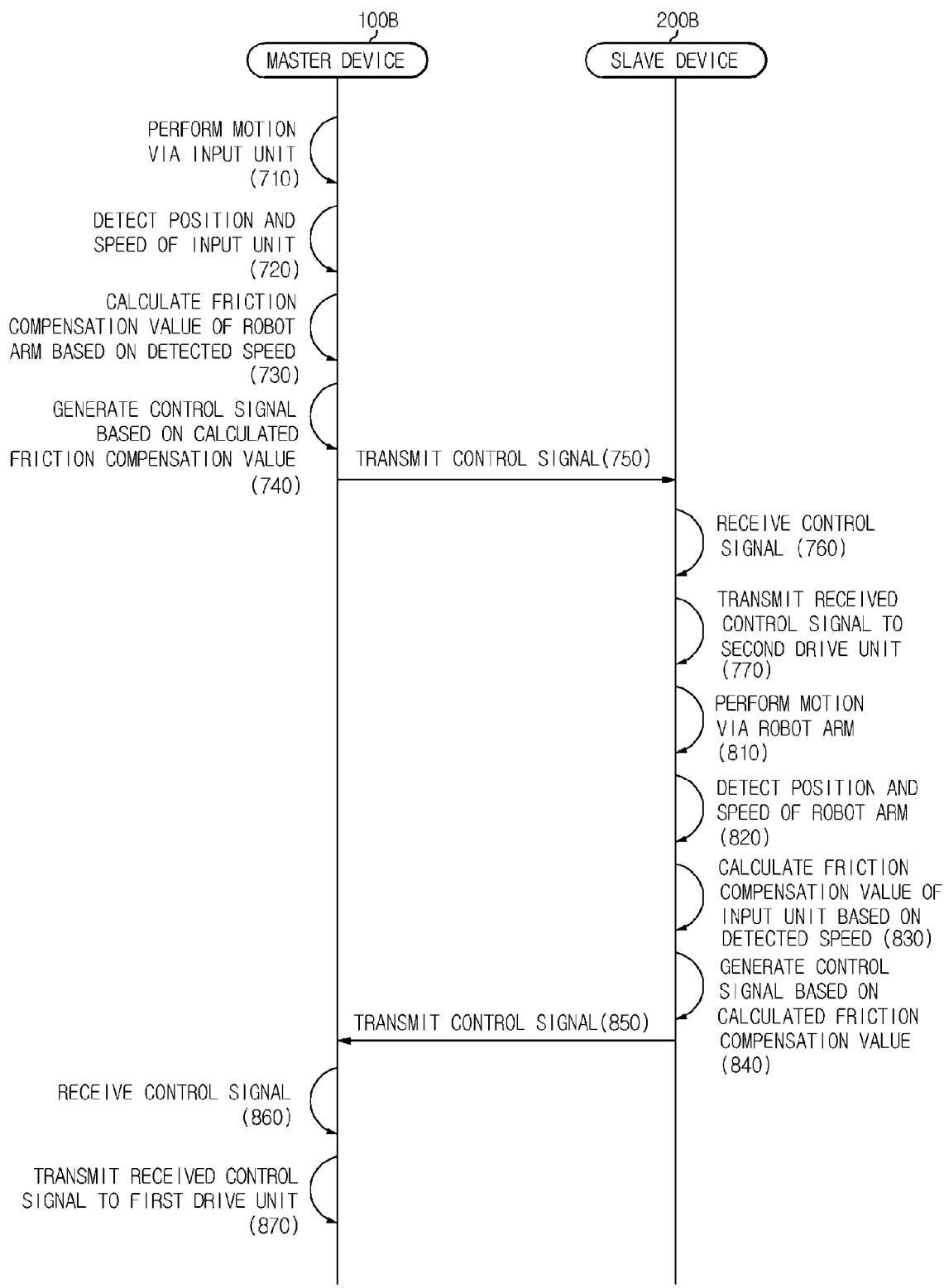
FIG. 7 is a diagram schematically illustrating an example of a friction compensation method with regard to a robot arm and an input unit that is performed by the surgical robot of FIG. 6.

FIG. 7 is a diagram schematically illustrating an example of a friction compensation method with regard to the robot arm and the input unit that is performed by the surgical robot of FIG. 6. If the input unit 10 of the master device 100B performs motion upon receiving a force from the operator D (710), a position and speed of the input unit 10 are detected (720). That is, a position and speed of the first joint 102 provided at the input unit 10 are detected. The position of the first joint 102 may be detected by the first position detector 110B, and the speed of the first joint 102 may be calculated by differentiating a position signal of the first joint 102 detected by the first position detector 110B.

Thereafter, a friction compensation value to be applied to the second joint 202 of the robot arm may be calculated based on the detected speed of the first joint 102 (730). The friction compensation value to be applied to the second joint 202 may be calculated in different ways depending on an operational state of the robot arm.

More specifically, if an operational state of the robot arm is a stationary state, a friction compensation value to be applied to the second joint 202 may be calculated based on a speed of the input unit 10, i.e., a speed of the first joint 102 and a maximum stationary friction of the second joint 202 as represented by Equation 1. Calculating the friction compensation value according to Equation 1 includes transforming a speed $\dot{q}_m$ of the first joint 102 in the first joint space $Q_m$ into a speed $v_m$ of the first end effector 103 in the task space W, transforming the speed $v_m$ of the first end effector 103 in the task space W into a speed $\dot{q}_{m|s}$ of the first end effector 103 with respect to the second joint space $Q_s$, and calculating a friction compensation value to be applied to the second joint 202 by multiplying the speed $\dot{q}_{m|s}$ of the first end effector 103 with respect to the second joint space $Q_s$ by a friction coefficient $b_s$ of the second joint 202, wherein the friction coefficient $b_s$ is a maximum stationary friction coefficient of the second joint 202. The sign of the friction compensation value is determined based on the sign of the target speed $\dot{q}_{m|s}$ of the second joint 202. That is, the sign of the friction compensation value is also determined based on the motion direction of the input unit 10.

If the operational state of the robot arm is not a stationary state, a friction compensation value to be applied to the second joint 202 of the robot arm may be calculated based on the speed of the input unit 10, i.e., the speed of the first joint 102 and the kinetic friction of the second joint 202 as represented by Equation 1. Calculating the friction compensation value according to Equation 1 includes transforming a speed $\dot{q}_m$ of the first joint 102 in the first joint space $Q_m$ into a speed $v_m$ of the first end effector 103 in the task space W, transforming the speed $v_m$ of the first end effector 103 in the task space W into a speed $\dot{q}_{m|s}$ of the first end effector 103 with respect to the second joint space $Q_s$, and calculating a friction compensation value to be applied to the second joint 202 by multiplying the speed $\dot{q}_{m|s}$ of the first end effector 103 with respect to the second joint space $Q_s$ by a friction coefficient $b_s$ of the second joint 202, wherein the friction coefficient $b_s$ is a kinetic friction coefficient of the second joint 202.

Once the friction compensation value to be applied to the second joint 202 of the robot arm is calculated, a control signal to which the calculated friction compensation value is applied is generated (740), and is transmitted to the slave device 200B (750).

If the slave device 200B receives a control signal from the master device 100B (760), the received control signal is transmitted to the second drive unit 270B provided at the second joint 202, and the second drive unit 270B is driven in response to the control signal (770).

If the robot arm of the slave device 200B performs motion upon receiving an external force or via interaction with the external environment (810), a position and speed of the robot arm are detected (820). That is, a position and speed of the second joint 202 provided at the robot arm are detected. The position of the second joint 102 may be detected by the second position detector 210B, and the speed of the second joint 202 may be calculated by differentiating a position signal of the second joint detected by the second position detector 210B.

Thereafter, a friction compensation value to be applied to the first joint 102 of the input unit 10 is calculated based on the detected speed of the second joint 202 (830). The friction compensation value to be applied to the first joint 102 may be calculated in different ways depending on an operational state of the input unit 10.

More specifically, if an operational state of the input unit 10 is a stationary state, a friction compensation value to be applied to the first joint 102 may be calculated based on a speed of the robot arm, i.e., a speed of the second joint 202 and a maximum stationary friction of the first joint 102 as represented by Equation 4. Calculating the friction compensation value according to Equation 4 includes transforming a speed $\dot{q}_s$ of the second joint 202 in the second joint space $Q_s$ into a speed $v_s$ of the second end effector 203 in the task space W, transforming the speed $v_s$ of the second end effector 203 in the task space W into a speed $\dot{q}_{s|m}$ of the second end effector 203 with respect to the first joint space $Q_m$, and calculating a friction compensation value to be applied to the first joint 102 by multiplying the speed $\dot{q}_{s|m}$ of the second end effector 203 with respect to the first joint space $Q_m$ by a friction coefficient $b_m$ of the first joint 102, wherein the friction coefficient $b_m$ is a maximum stationary friction coefficient of the first joint 102. The sign of the friction compensation value is determined based on the sign of the target speed $\dot{q}_{s|m}$ of the first joint 102. That is, the sign of the friction compensation value is also determined based on the motion direction of the robot arm.

If the operational state of the input unit 10 is not a stationary state, a friction compensation value to be applied to the first joint 102 of the input unit 10 may be calculated based on the speed of the robot arm, i.e., the speed of the second joint 202 and the kinetic friction of the first joint 102 as represented by Equation 4. Calculating the friction compensation value according to Equation 4 includes transforming a speed $\dot{q}_s$ of the second joint 202 in the second joint space $Q_s$ into a speed $v_s$ of the second end effector 203 in the task space W, transforming the speed $v_s$ of the second end effector 203 in the task space W into a speed $\dot{q}_{s|m}$ of the second end effector 203 with respect to the first joint space $Q_m$, and calculating a friction compensation value to be applied to the first joint 102 by multiplying the speed $\dot{q}_{s|m}$ of the second end effector 203 with respect to the first joint space $Q_m$ by a friction coefficient $b_m$ of the first joint 102, wherein the friction coefficient $b_m$ is a kinetic friction coefficient of the first joint 102.

Once the friction compensation value to be applied to the first joint 102 of the input unit 10 is calculated, a control signal to which the calculated friction compensation value is applied is generated (840), and is transmitted to the master device 100B (850).

If the master device 100B receives a control signal from the slave device 200B (860), the received control signal is transmitted to the first drive unit 170B provided at the first joint 102, and the first drive unit 170B is driven in response to the control signal (870). By compensating for friction of the input unit 10 based on the speed of the robot arm, the operator D who is manipulating the input unit 10 of the master device 100B may perceive an external force applied to the robot arm via the input unit 10.

Figure 8:
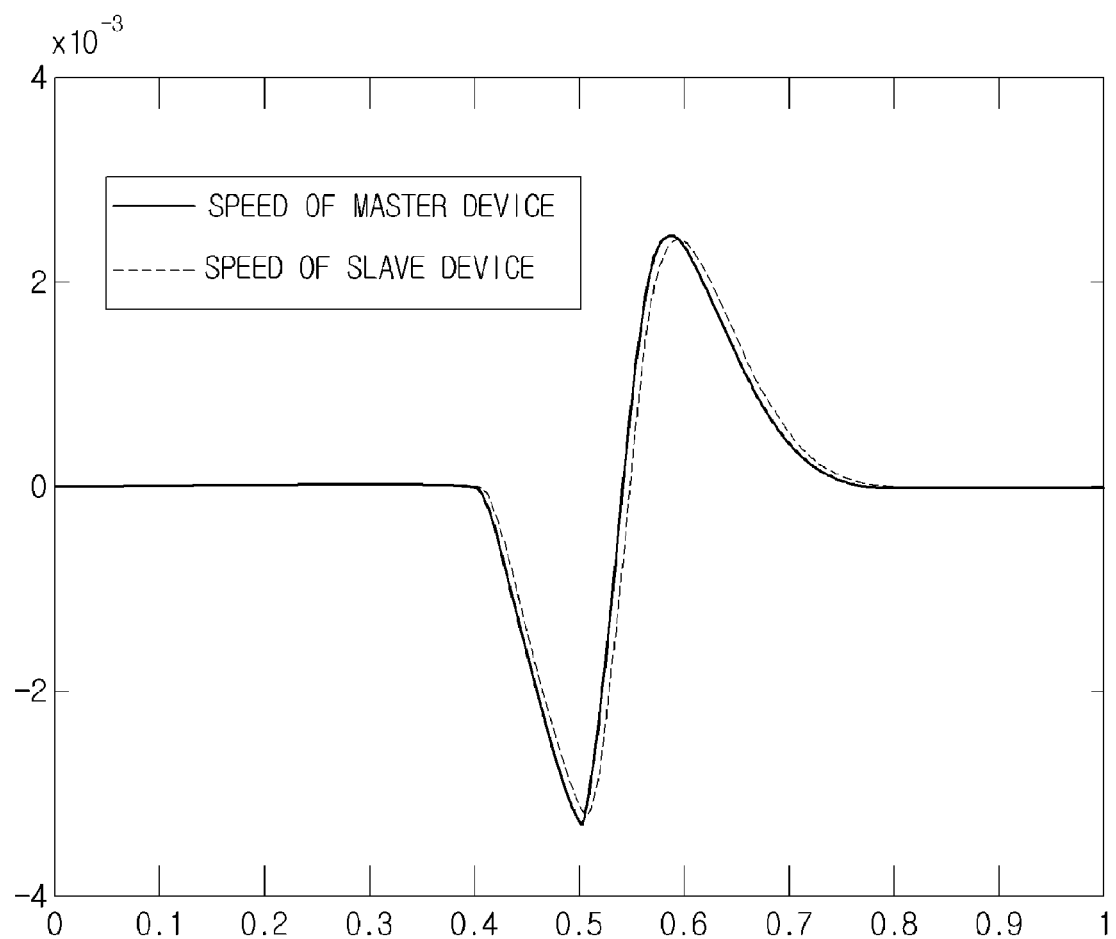
FIG. 8 is a graph illustrating an example of variations in speeds of a master device and a slave device when friction compensation is performed.
Figure 9:
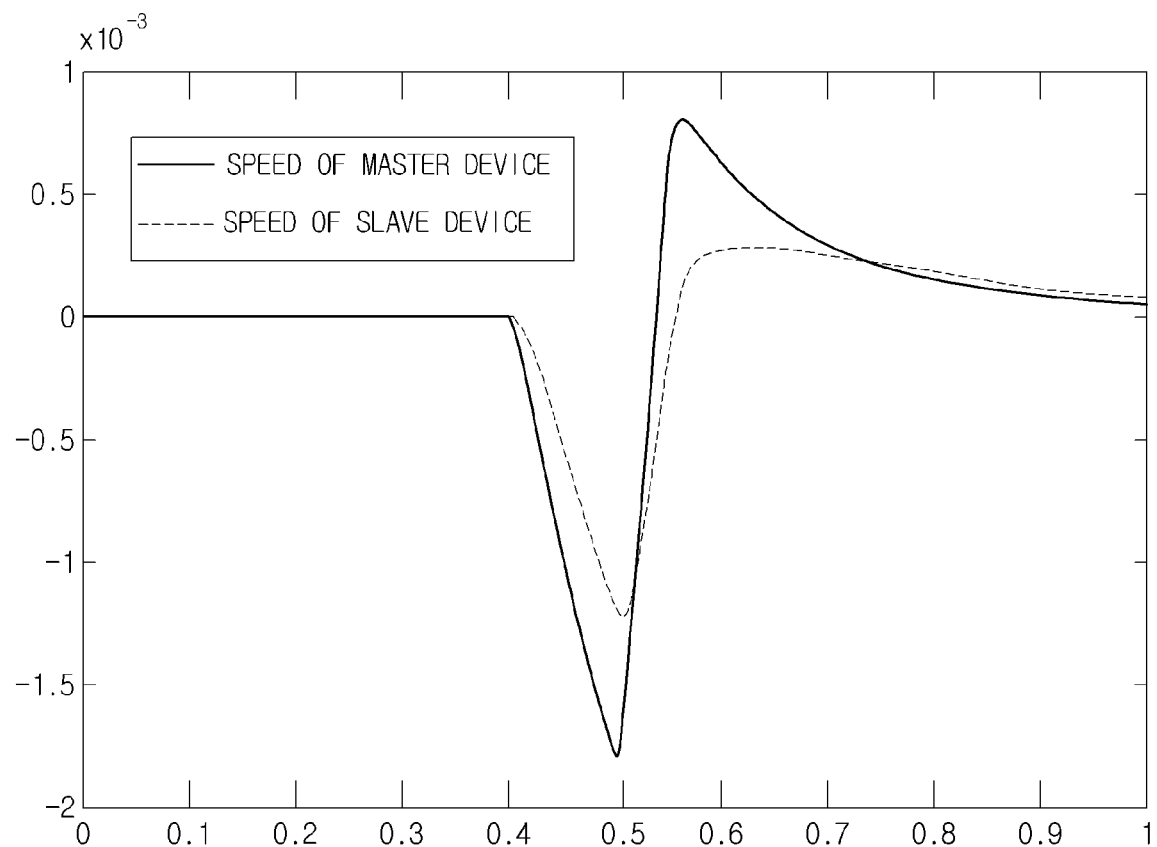
FIG. 9 is a graph illustrating an example of variations in speeds of a master device and a slave device when friction compensation is not performed.

FIG. 8 is a graph illustrating an example of variations in speeds of the master device and the slave device when friction compensation is performed. FIG. 9 is a graph illustrating an example of variations in speeds of the master device and the slave device when friction compensation is not performed.

As can be seen from FIG. 8, when performing friction compensation according to the examples described above, the speed variation of the master device substantially coincides with the speed variation of the slave device. That is, it can be seen that the slave device (or master device) naturally tracks motion of the master device (or slave device).

On the other hand, when not performing friction compensation, as illustrated in FIG. 9, the speed variation of the master device differs from the speed variation of the slave device.

As is apparent from the above description, by performing friction compensation of a slave device using a speed generated in a master device, even when the slave device has no speed sensor or has a low-performance speed sensor, it is possible to control the slave device so that a motion of the slave device smoothly tracks a motion of the master device.

Further, when performing friction compensation of the slave device using the speed generated in the master device, it may be unnecessary to provide each joint of the slave device with a speed sensor. This may reduce production costs as compared to the case of using the speed sensor, and may make it easier to design the slave device.

Applying a speed and an external force generated in the slave device to a motion of the master device may allow an operator of the master device to manipulate the master device in consideration of motion of the slave device.

During compensation of stationary friction of the slave device, a motion direction of the slave device may be determined based on a motion direction of the master device, which results in effective compensation of stationary friction. Accordingly, the slave device may smoothly track a motion of the master device starting from the beginning of the motion of the master device.

The first controllers 140, 140A, and 140B, the first speed calculators 141 and 141B, the first transformers 142 and 142B, the first friction compensation value calculators 143 and 143B, the first control signal generators 144 and 144B, the first image processors 145, 145A, and 145B, the first communication units 180, 180A, and 180B, the second controllers 240, 240A, and 240B, the second speed calculators 241A and 241B, the second transformers 242A and 242B, the second friction compensation value calculators 243A and 243B, the second control signal generators 244A and 244B, the second image processors 245, 245A, and 245B, and the second communication units 280, 280A, and 280B illustrated in FIGS. 2, 4, and 6 that perform the operations illustrated in FIGS. 3, 5, 7, and 8 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A robot comprising:
   a master device comprising an input unit, the input unit comprising a first end effector and a first joint;
   a slave device configured to be controlled by the master device and comprising a robot arm, the robot arm comprising a second end effector, a second joint, and a motor configured to drive the second joint; and
   a controller configured to:
     calculate a friction compensation value to compensate for friction of the second joint based on a speed of the input unit in response to the input unit being in motion;
     generate a control signal based on the friction compensation value; and
     transmit the control signal to the motor configured to drive the second joint.

2. The robot of claim 1, wherein the controller is further configured to:
   calculate the friction compensation value based on a speed of the input unit and a kinetic friction of the second joint in response to the robot arm being in motion; and
   calculate the friction compensation value based on the speed of the input unit, a maximum stationary friction of the second joint, and a motion direction of the input unit in response to the robot arm being stationary, a sign of the friction compensation value being determined based on the motion direction of the input unit.

3. The robot of claim 1, wherein the master device further comprises a speed detector configured to detect the speed of the input unit.

4. The robot of claim 1, wherein the master device further comprises a position detector configured to detect a position of the input unit; and
   the controller is further configured to calculate the speed of the input unit based on the position of the input unit.

5. The robot of claim 1, wherein the controller is further configured to calculate the friction compensation value by:
   transforming the speed of the input unit into a speed of the second joint; and
   multiplying the speed of the second joint by a friction coefficient of the second joint to obtain the friction compensation value.

6. A robot comprising:
   a master device comprising an input unit, the input unit comprising a first end effector, a first joint, and a motor configured to drive the first joint;
   a slave device configured to be controlled by the master device and comprising a robot arm, the robot arm comprising a second end effector and a second joint; and
   a controller configured to:
     calculate a friction compensation value to compensate for friction of the first joint based on a speed of the robot arm in response to the robot arm being in motion;
     generate a control signal based on the friction compensation value; and
     transmit the control signal to the motor configured to drive the first joint.

7. The robot of claim 6, wherein the controller is further configured to:
   calculate the friction compensation value based on a speed of the robot arm and a kinetic friction of the first joint in response to the input unit being in motion; and
   calculate the friction compensation value based on the speed of the robot arm, a maximum stationary friction of the first joint, and a motion direction of the robot arm in response to the input unit being stationary, a sign of the friction compensation value being determined based on the motion direction of the robot arm.

8. The robot of claim 6, wherein the controller is further configured to calculate the friction compensation value by:
   transforming the speed of the robot arm into a speed of the first joint; and
   multiplying the speed of the first joint by a friction coefficient of the first joint.

9. The robot of claim 6, wherein the slave device further comprises a speed detector configured to detect the speed of the robot arm.

10. The robot of claim 6, wherein the slave device further comprises a position detector configured to detect a position of the robot arm; and
    the controller is further configured to calculate the speed of the robot arm based on the position of the robot arm.

11. A robot comprising:
    a master device comprising an input unit, the input unit comprising a first end effector, a first joint, and a first motor configured to drive the first joint;
    a slave device configured to be controlled by the master device and comprising a robot arm, the robot arm comprising a second end effector, a second joint, and a second motor configured to drive the second joint;
    a first controller configured to:
      calculate a first friction compensation value to compensate for friction of the second joint based on a speed of the input unit in response to the input unit being in motion;
      generate a first control signal based on the first friction compensation value; and
      transmit the first control signal to the second motor configured to drive the second joint; and
    a second controller configured to:
      calculate a second friction compensation value to compensate for friction of the first joint based on a speed of the robot arm in response to the robot arm being in motion;
      generate a second control signal based on the second friction compensation value; and
      transmit the second control signal to the first motor configured to drive the first joint.

12. The robot of claim 11, wherein the first controller is further configured to:
    calculate the first friction compensation value based on a speed of the input unit and a kinetic friction of the second joint in response to the robot arm being in motion; and
    calculate the first friction compensation value based on the speed of the input unit, a maximum stationary friction of the second joint, and a motion direction of the input unit in response to the robot arm being stationary, a sign of the first friction compensation value being determined based on the motion direction of the input unit.

13. The robot of claim 11, wherein the first controller is further configured to calculate the first friction compensation value by:
    transforming the speed of the input unit into a speed of the second joint; and
    multiplying the speed of the second joint by a friction coefficient of the second joint to obtain the first friction compensation value.

14. The robot of claim 11, wherein the second controller is further configured to:
    calculate the second friction compensation value based on a speed of the robot arm and a kinetic friction of the first joint in response to the input unit being in motion; and
    calculate the second friction compensation value based on the speed of the robot arm, a maximum stationary friction of the first joint, and a motion direction of the robot arm in response to the input unit being stationary, a sign of the second friction compensation value being determined based on the motion direction of the robot arm.

15. The robot of claim 11, wherein the second controller is further configured to calculate the second friction compensation value by:
    transforming the speed of the robot arm into a speed of the first joint; and
    multiplying the speed of the second joint by a friction coefficient of the first joint to obtain the second friction compensation value.

16. The robot of claim 11, wherein the first controller is provided at the master device or the slave device; and
    the second controller is provided at the master device or the slave device.

17. A robot comprising:
    a first device comprising an input unit;
    a second device configured to be controlled by the first device in response to manipulation of the input unit by a user and comprising a robot arm; and
    a controller configured to:
      generate a control signal to control movement of the robot arm and compensate for friction of the robot arm based on a speed of the input unit; and
      transmit the control signal to the robot arm.

18. The robot of claim 17, wherein the controller is further configured to:
    generate a friction compensation value to compensate for the friction of the robot arm based on the speed of the input unit in response to the robot arm being in motion, and based on a maximum stationary friction of the robot arm in response to the robot arm being stationary; and
    generate the control signal based on the friction compensation value.

19. The robot of claim 17, further comprising another controller configured to:
    generate another control signal to control movement of the input unit and compensate for friction of the input unit based on a speed of the robot arm; and
    transmit the other control signal to the input unit.

20. The robot of claim 19, wherein the other controller is further configured to:
    generate a friction compensation value to compensate for the friction of the input unit based on the speed of the robot arm in response to the input unit being in motion, and based on a maximum stationary friction of the input unit in response to the input unit being stationary; and
    generate the other control signal based on the friction compensation value.

* * * * *